United States Patent [19]

Ueno et al.

[11] Patent Number: 5,268,006
[45] Date of Patent: Dec. 7, 1993

[54] CERAMIC CAPACITOR WITH A GRAIN BOUNDARY-INSULATED STRUCTURE

[75] Inventors: Iwao Ueno, Ibaraki; Yasuo Wakahata, Katano; Kimio Kobayashi, Hirakata; Kaori Okamoto, Takatsuki; Akihiro Takami, Katano, all of Japan

[73] Assignee: Matsushita Electric Industrial Co., Ltd., Osaka, Japan

[21] Appl. No.: 920,749

[22] Filed: Jul. 28, 1992

Related U.S. Application Data

[62] Division of Ser. No. 582,220, Sep. 28, 1990, Pat. No. 5,166,759.

[30] Foreign Application Priority Data

| | | | |
|---|---|---|---|
| Mar. 15, 1989 | [JP] | Japan | 1-62402 |
| Mar. 15, 1989 | [JP] | Japan | 1-62403 |
| Mar. 15, 1989 | [JP] | Japan | 1-62404 |
| Apr. 5, 1989 | [JP] | Japan | 1-86243 |
| Jun. 9, 1989 | [JP] | Japan | 1-147901 |
| Mar. 14, 1990 | [WO] | PCT Int'l Appl. | PCT/JP90/00334 |

[51] Int. Cl.$^5$ .................. H01G 7/00; H01G 4/06
[52] U.S. Cl. .................. 29/25.03; 29/25.42; 252/520; 252/521; 361/311; 361/321.5
[58] Field of Search .............. 437/919; 148/DIG. 17; 361/311, 321; 29/25.42, 25.03; 427/79; 252/520, 521

[56] References Cited

U.S. PATENT DOCUMENTS

| | | | |
|---|---|---|---|
| 3,149,399 | 9/1964 | Sprague et al. | 357/14 |
| 3,386,856 | 6/1968 | Noorlander | 357/10 |
| 3,569,802 | 3/1971 | Brauer et al. | 357/10 |
| 3,673,119 | 6/1972 | Ueoka et al. | 357/10 |
| 3,872,360 | 3/1975 | Sheard | 361/311 |
| 4,403,236 | 9/1983 | Mandai et al. | 252/520 |
| 4,419,310 | 12/1983 | Burn et al. | 357/10 |
| 4,438,214 | 3/1984 | Masuyama et al. | 252/520 |
| 4,519,942 | 5/1985 | Yamoka et al. | 252/520 |
| 4,541,974 | 9/1985 | Yamaoka et al. | 264/61 |
| 4,607,314 | 8/1986 | Wada et al. | 252/520 |
| 4,781,859 | 11/1988 | Noi | 252/520 |

FOREIGN PATENT DOCUMENTS

| | | |
|---|---|---|
| 0157276 | 3/1985 | European Pat. Off. |
| 157276 | 10/1985 | European Pat. Off. |
| 0261419 | 8/1987 | European Pat. Off. |
| 3435806 | 9/1984 | Fed. Rep. of Germany |
| 54-53248 | 4/1979 | Japan |
| 57-27001 | 2/1982 | Japan |
| 57-35303 | 2/1982 | Japan |
| 58-23921 | 2/1983 | Japan |
| 59-215701 | 12/1984 | Japan |
| 63-219115 | 9/1988 | Japan |

*Primary Examiner*—Olik Chaudhuri
*Assistant Examiner*—Ramamohan Rao Paladugu
*Attorney, Agent, or Firm*—Panitch Schwarze Jacobs & Nadel

[57] ABSTRACT

A method for manufacturing semiconductor-type laminated ceramic capacitors with a grain boundary-insulated structure including the steps of calcinating starting material of mixed powder in air or in nitrogen atmosphere after grinding, mixing and drying the mixed powder; forming raw sheets; printing a pattern of inner electrode paste on the surface of the raw sheets; calcinating the laminated body in air; sintering the laminated raw sheets in reducing atmosphere or in nitrogen atmosphere after calcination; re-oxidizing in air after sintering; and covering the edges of sintered ceramic sheets with outer electrode paste and baking after re-oxidation, terminals of inner electrodes being exposed to the edges, wherein: the starting material of mixed powder comprises a material of the composition $Sr_{(1-x)}Ba_xTiO_3$ containing excess Ti to make a final molecular ratio of Ti to $Sr_{(1-x)}Ba_x$ in the range of $0.95 \leq Sr_{(1-x)}Ba_x/Ti < 1.00$ (where x is in the range of $0 < x \leq 0.3$); a first component of at least one or more kinds of the compounds selected from $Nb_2O_5$, $Ta_2O_5$, $V_2O_5$, $W_2O_5$, $Dy_2O_5$, $Nd_2O_3$, $Y_2O_3$, $La_2O_3$, or $CeO_2$; a second component of Mn and Si converted into $MnO_2$ and $SiO_2$ respectively; and an optional third component of at least one or more kinds of the compounds selected from $Na_2SiO_3$, $NaAlO_2$, $Li_2SiO_3$, $LiAlO_2$, and $Al_2O_3$.

16 Claims, 2 Drawing Sheets

CERAMIC CAPACITOR WITH A GRAIN BOUNDARY-INSULATED STRUCTURE

CROSS REFERENCE TO RELATED APPLICATIONS

This application is a division of U.S. patent application Ser. No. 07/582,220, filed Sep. 28, 1990, now U.S. Pat. No. 5,166,759.

TECHNICAL FIELD

The present invention relates to a semiductor-type laminated ceramic capacitor with a grain boundary-insulated structure and a method for producing the same, and more particularly to a ceramic capacitor which absorbs both low voltage noises and high frequency noises under the normal operational conditions as a capacitor, works as a varistor against invading high voltage loads such as pulses and electrostatic charges, thereby protecting built-in semiconductors and electronic equipment from being damaged by abnormal voltage loads such as noises, pulses and electrostatic charges arising from surrounding electronic equipment, wherein characteristics of said ceramic capacitor being stable to temperature changes.

BACKGROUND ART

Recently, semiconductor elements such as IC and LSI are widely used in electronic devices and equipment to realize multifunctional applications of the equipment and to make the equipment light, small and handy. However, the use of many semiconductor elements makes the electronic devices less resistant to disturbance by electric noises. The conventional method to protect the electronic devices from invading electric noises is to integrate by-pass capacitors such as film capacitor, laminated ceramic capacitor and semiconductor ceramic capacitor into the power line of IC and LSI. These capacitors display excellent performances in absorbing low voltage noises and high frequency noises. They are, however, so impotent to high voltage pulses and electrostatic charges that malfunctionings of the equipment, break-down of semiconductors and/or capacitors themselves occur frequently when the electronic equipment are invaded by high voltage pulses or electrostatic charges. Therefore, these technical problems in the conventional capacitors should be improved.

A new type capacitor, which has sufficient resistance and excellent absorbing ability to pulses as well as good noise absorbing ability and stability to temperature and frequency changes, was developed and disclosed in Japanese Laid-Open Patent Publication No 57-27001 and (corresponding to U.S. Pat. Nos. 4,519,942 and 4,541,974) etc., wherein a varistor function was added capacitor made of $SrTiO_3$ series of ceramic materials and the capacitor was defined as "a grain boundary insulated, semiconductor type ceramic capacitor having a varistor function" (hereinafter referred to as a ceramic capacitor with varistor function). This ceramic capacitor with varistor function works as a varistor when high voltage pulses and electrostatic charges invade it, and absorbs low voltage noises and high frequency noises as a conventional capacitor, thereby protecting the electronic equipment and built-in semiconductors from abnormal high voltage noises, pulses and electrostatic charges generated by surrounding electronic equipment and devices, and providing wide application fields of the capacitor.

Since the electronic parts are made to be more sophisticated, lighter, smaller, and more handy, ceramic capacitors with varistor function are also required to be smaller but higher in performance. The effective electrode area of the conventional single-plate type ceramic capacitor with varistor function will be, however, decreased when the capacitor is miniaturized, resulting in the reduction of electric capacitance and hence inferior reliability of the capacitor. A capacitor having laminated structure of the electrode is devised to solve the aforementioned problem, wherein the effective electrode area is expected to be increased. However, the ceramic capacitor with varistor function is conventionally manufactured by the process comprising a step of coating the surface of $SrTiO_3$ type semiconductor element with oxides, followed by a thermal diffusion process to form an electric insulating layer in the grain boundaries. It is recognized to be very difficult to manufacture "a laminate type ceramic capacitor having varistor function" (hereinafter referred to as a laminated ceramic capacitor with varistor function) by sintering the material of the ceramic capacitor simultaneously with the material of an inner electrode, though conventional laminated ceramic capacitors made of $BaTiO_3$ series of materials are manufactured by this process.

As a method to overcome the problem of simultaneous formation of a material of laminated ceramic capacitor with varistor function by sintering the material of the ceramic capacitor together with the material of inner electrode, the following method for manufacturing a laminated ceramic capacitor with varistor function is developed and provided, using methods as are disclosed in Japanese Laid-Open Patent Publication No. 54-53248 and Japanese Laid-Open Patent Publication No. 54-53250, comprising the steps of: printing a pattern corresponding to the inner electrode by using ceramic paste enriched in organic binder on the surface of the ceramic substrate; forming a porous sheet corresponding to the pattern of the inner electrode by sintering; and impregnating the porous sheet with electrically conducting metals under the appropriate pressure, or alternatively a step of forming a pattern of inner electrodes by gilding or fusion method. These processes, however, involve many difficulties and they are yet far from practical applications.

Japanese Laid-Open Patent Publication No. 59-215701 provides a method comprising the manufacturing steps of: forming a raw sheet made of ceramic powder calcinated in the non-oxidizing atmosphere; printing a pattern of the inner electrode by using an electric conductive paste mixed with a thermal diffusion material on the surface of the raw sheet, said thermal diffusion material having the ability to form an electric insulating layers in the grain boundaries; and sintering said raw sheet in the oxidizing atmosphere. Another method disclosed in Japanese Laid-Open Patent Publication No 63-219115 comprises the manufacturing steps of: forming a raw sheet made of semiconductive ceramic powder as a main component, said main component being mixed with oxide to form an insulating layer and/or diffusion material containing a glass material; laminating said raw sheets with a plurality of inner electrode sheets mutually one by one; and sintering said laminated sheets in air or in the oxidizing atmosphere. In the above-discussed two manufacturing methods, however, sintering is performed at relatively low temperatures of 1000°–1200° C. Therefore, the capacitor elements thus formed are not a perfect sintered body of ceramic powder wherein grain boundaries are scarcely contacted with their faces. The ceramic capacitors obtained entail the shortcomings comprising: relatively small electric capacitance; small value of voltage non-linearity coefficient $\alpha$ which is a representative characteristics of a capacitor having varistor function; instability of varistor voltage; and inferior reliability as a capacitor. The manufacturing method disclosed in the latter invention, Japanese Laid-Open Patent Publication No. 63-219115, involves the step of adding a glass material to the ceramic powder which entails a problem in that glassy phase deposits in the grain boundaries, whereby said electric characteristic tends to be poor and the capacitor element is not recognized as reliable. The manufacturing process is considered to be far from practical.

Concerning the laminated capacitors having varistor function, voltage non-linear laminated capacitor elements made of $ZnO$, $Fe_2O_3$ and $TiO_2$ series of ceramic material have been provided in Japanese Laid-Open Patent Publication No. 58-23921. Capacitance of the capacitor elements of this type are, however, very small and they involve deficiencies that they display little effect to the electric noises with voltage of below the varistor region or to high frequency noises, while they have excellent ability to absorb pulses and electrostatic charges of relatively high voltage.

DISCLOSURE OF THE INVENTION

Although many attempts have been made and the technical results are provided in the prior art concerning the compositions and manufacturing methods of the various kinds of laminated ceramic capacitors with varistor function, they involve deficiencies and shortcomings with regards to the manufacturing process itself or to the performances of the capacitor elements manufactured. None of them are considered to be practical yet, and novelties in compositions and manufacturing methods of the laminated ceramic capacitors with varistor function are expected to be developed.

The present invention with respect to the above has an objective to provide a semiconductor-type laminated ceramic capacitor with a grain boundary-insulated structure made of the materials of $Sr_{(1-x)}Ba_xTiO_3$ type ceramics as a main component and a method for producing the same, providing the functions of: a conventional capacitor to absorb low voltage noises and high frequency noises; a varistor when high voltage pulses and electrostatic charges invade the circuit; and a capacitor having the characteristics of being stable to temperature variations, wherein the capacitor element is manufactured by simultaneous sintering of the materials of ceramic capacitor together with the inner electrode materials.

The present invention, which overcomes the deficiencies and shortcomings of the prior art, provides a semiconductor-type laminated ceramic capacitor with a grain boundary-insulated structure comprising a plurality of inner electrodes on the surface of the grain boundary insulated, semiconductor type ceramic sheets, the terminal of each of said inner electrodes being extended to one edge of the corresponding ceramic sheet and said ceramic sheets being laminated so that said terminals of said inner electrodes come to the corresponding opposite edges of said ceramic sheets alternatively one by one; and outer electrodes electrically connected to said terminals of inner electrodes at the edge of said grain boundary insulated, semiconductor type ceramic sheets, wherein said ceramic sheets comprises a material of the composition of $Sr_{(1-x)}Ba_xTiO_3$ containing excess Ti to make final molecular ratio of Ti to $Sr_{(1-x)}Ba_x$ in the range of $0.95 \leq Sr_{(1-x)}Ba_x/Ti < 1.00$ (where x is in the range of $0 < x \leq 0.3$); at least one or more kinds of the compounds selected from $Nb_2O_5$, $Ta_2O_5$, $V_2O_5$, $W_2O_5$, $Dy_2O_3$, $Nd_2O_3$, $Y_2O_3$, $La_2O_3$ or $CeO_2$ are added to the ceramic material to make their relative molar content in the range from 0.05 to 2.0%; and Mn and Si are also included in the ceramic material to the amount of their combined relative molar content, converting into $MnO_2$ and $SiO_2$ respectively, in the range of 0.2 to 5.0 mol%.

Generally speaking, ceramic material of the composition of $Sr_{(1-x)}Ba_xTiO_3$ is made semiconductive by a forced reduction process or, after adding an accelerating agent to make the material semiconductive, by a sintering process in the reducing atmosphere. The process to make the material semiconductive, however, may remain incomplete according to the nature of the agent used. When the amount of $Sr_{(1-x)}Ba_x$ or Ti is made slightly in excess out of the stoichiometric ratio of $Sr_{(1-x)}Ba_xTiO_3$, lattice defect in the crystal of the ceramics will increase, thereby accelerating the material to be semiconductive. In addition, the ceramic material is made semiconductive advantageously by adding $Nb_2O_5$, $Ta_2O_5$, $V_2O_5$, $W_2O_5$, $Dy_2O_3$, $Nd_2O_3$, $Y_2O_3$, $La_2O_3$ or $CeO_2$ (hereinafter referred to as first components) since these compounds control the atomic valency.

Next, Mn and Si (hereinafter referred to as second components) are the essential compounds to form a laminated structure and absence of one of the two compounds will result in the incomplete formation of the lamellar structure. As mentioned above, manufacturing of laminated ceramic capacitors with varistor function was considered to be difficult in the prior art. The first reason depends on the fact that the material for the ceramic capacitor with varistor function such as $SrTiO_3$ series of ceramics displays a different nature and behavior with the material of inner electrode during the sintering and re-oxidation processes. The former materials require a reducing atmosphere in the sintering process while the latter materials made of metals expand in volume by occluding hydrogen gas in the reducing atmosphere. Furthermore, the latter material is oxidized into metal oxide and tends to block re-oxidation of the former material during the re-oxidation process in the air.

Formation of a ceramic capacitor element with varistor function by using the former material, which is the second reason why the process is difficult, involves a process of surface diffusion comprising the steps of: making the material semiconductive by sintering in the reducing atmosphere; covering the surface of the ceramic sheets with metal oxides with high electric resistance (i.e. $MnO_2$, $CuO_2$, $Bi_2O_3$, $Co_2O_3$) followed by re-oxidation in the air; and insulating grain boundaries by selective diffusion of the metal oxides. However, in the structure of the capacitor element laminated by the ceramic plate and inner electrode material mutually one by one, diffusion of metal oxides into grain boundaries is technically difficult.

The inventors of the present invention discovered the following facts through their studies.

First, a ceramic capacitor with varistor function was readily manufactured by adding the second components as well as the first components into the ceramic material of $Sr_{(1-x)}Ba_xTiO_3$ with excess Ti, and by sintering the material in the reducing atmosphere followed by re-oxidation process. Spreading of metal oxide paste with high electric resistance over the surface of the ceramic plates was found to be needless to form insulating grain boundaries. The experimental facts are interpreted as follows; the second components added, together with excess Ti, forms a liquid phase comprising of Mn, Si and Ti ternary oxide system at relatively low temperatures during sintering process. The liquid phase enhances sintering of grains while the oxides melt and segregate in the grain boundaries. Re-oxidation of the capacitor element, in the boundaries of which a liquid phase comprising of Mn, Si and Ti ternary oxide system is formed in the air, completes the formation of an insulating metal Oxide film comprising segregated ternary oxides of Mn, Si and Ti in the grain boundaries, thereby readily producing a ceramic capacitor with varistor function having the structure of a grain boundary insulation layer. Excess Ti was found to prevent oxidation of inner electrode as well as diffusion of metal oxides into the inner electrode. For this reason the ceramic material of $Sr_{(1-x)}Ba_xTiO_3$ with excess Ti was used in the present invention.

Second, the material of $Sr_{(1-x)}Ba_xTiO_3$, with excess Ti, to which the second component was added, was made semiconductive by sintering in the nitrogen atmosphere as well as in the reducing atmosphere. The finding can be partly interpreted by the same reason as is described in the discussions of the first experiment, in that the material is made liquid phase at relatively low temperature. The Mn added not only forms a liquid phase but also works as an atomic valence control agent. In working as an atomic valence control agent, the ionic valence of Mn ion is +2 or +4 and its electronic state is unstable and liable to be excited, thereby increasing the sinterability. This is the reason the ceramic material is readily made semiconductive through the sintering process in the nitrogen atmosphere by adding Mn ion as a second component.

Third, the raw materials formed into the laminated capacitor sheets were calcinated in the air before being subjected to the sintering process. This treatment prevented the product, laminated ceramic capacitor with varistor function, from breaking electric connections in the inner electrodes, de-lamination of the ceramic sheets, cracking in the ceramic sheets, decrease in sintering density and nonuniformity in the sintered body etc. Furthermore, electric characteristics and reliability in performance of the capacitor such as capacitance, voltage non-linearity coefficient $\alpha$ and varistor voltage was also largely improved.

According to the present invention, with respect to the above, a laminated ceramic capacitor with varistor function, comprising the manufacturing steps of sintering the material of ceramic capacitor with varistor function together with materials of inner electrode simultaneously, can be readily manufactured.

BRIEF DESCRIPTIONS OF THE DRAWINGS

BEST MODE FOR CARRYING OUT THE INVENTION

Details of the present invention will be described hereinafter with reference to the examples.

EXAMPLE 1

Powders of $TiO_2$ were added to the powder material of $SrO_{0.8}Ba_{0.2}TiO_3$ of mean particle size of 0.5 $\mu$m or less and purity of 98% or more, adjusting the molar ratio of $Sr_{(1-x)}Ba_x/Ti$ (hereinafter referred to as A/B ratio). First component, $Nb_2O_5$, and second components, $MnO_2$ and $SiO_2$ (the relative molar content of the two compounds are made equal, respectively), were weighed and mixed to the material described above, as are shown in Tables 1-15. The mixed powder was ground and mixed in a wet state by using a ball mill and, after drying, the ground powder was subjected to a calcination process by heating at 600°-1200° C. in the air. The calcinated powder was ground again to make a mean particle size of 0.5 $\mu$m or less, to provide the powder for the starting material of a laminated ceramic capacitor with varistor function. The finely powdered starting material was dispersed in an organic solvent together with an organic binder such as butyral resin compound to form a slurry. The slurry was next formed into a raw sheet with its thickness of about 50 $\mu$m by using the method of Dr. Blade, and the sheet was cut into a predetermined size.

Figure 1:
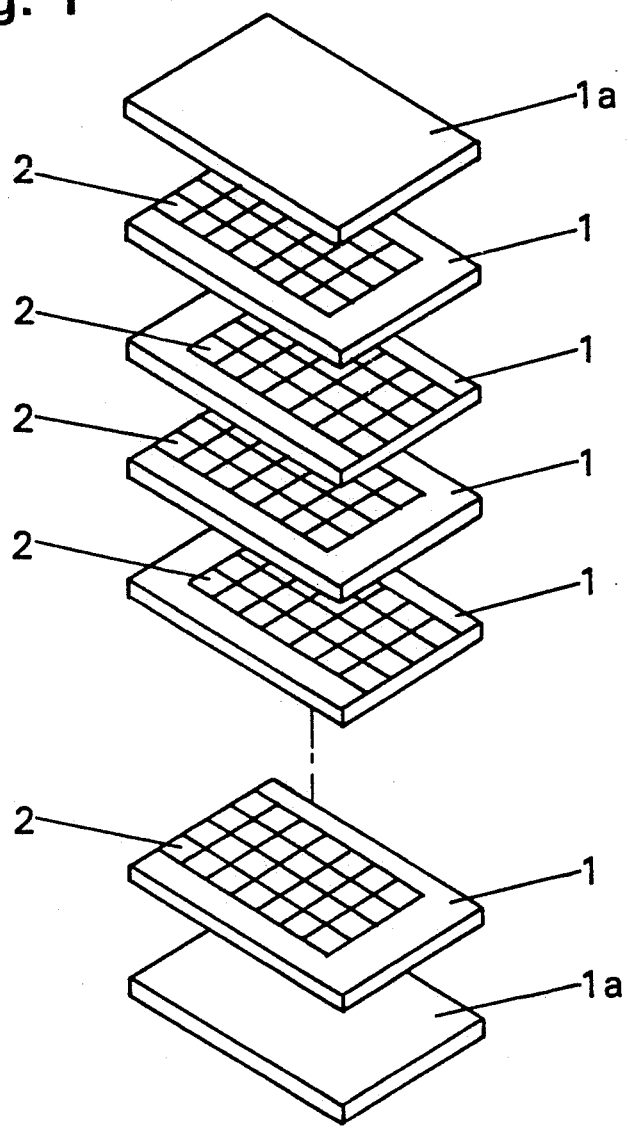
FIG. 1 is an exploded perspective view to explain the examples of the present invention, showing laminated raw sheets and the pattern of the inner electrode paste printed on said raw sheet.

A pattern of inner electrode paste 2 containing Pd was printed by a screen printing technique corresponding to the predetermined size, as is shown in FIG. 1, on the raw sheet 1 formed by the above-described method. As is apparent from FIG. 1, inner electrode pastes 2 are not printed on the uppermost and lowermost part of the raw sheet 1a in the laminated capacitor material. The pattern of inner electrode paste 2 on the intermediate part of the laminated raw sheet 1 reaches to the one edge of the sheet, and the edges are distributed alternatively one by one to the opposite(different) directions in the laminates. The raw sheets 1a were disposed on the uppermost and lowermost parts and raw sheets 1 printed with the above inner electrode pastes thereon were laminated therebetween, a plurality of this sheet pairs were pressed and compacted with a heat treatment. The pressed sheets were then calcinated and degreased by heating at 600°-1250° C. in the air. The calcinated sheets were next subjected to sintering by heating at 1200°-1350° C. in a reducing atmosphere, followed by re-oxidation by heating at 900°-1250° C. in the air.

Figure 2:
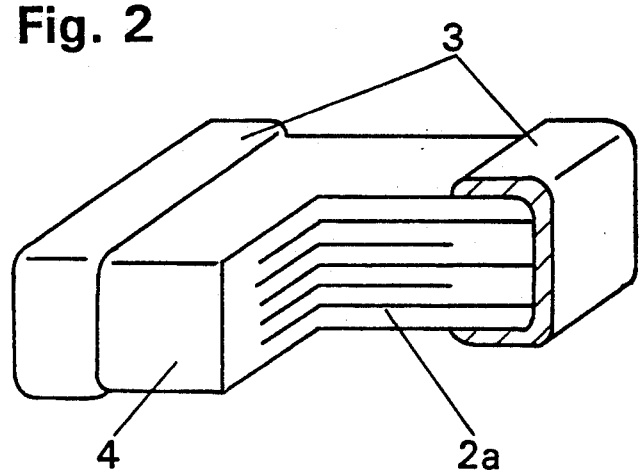
FIG. 2 is a partially cutaway view of the laminated ceramic capacitor with varistor function obtained from the examples of the present invention.

As shown in FIG. 2, the outer electrode paste containing Ag was painted on the edges of the sheets, where terminals of inner electrodes 2a were exposed alternatively and the silver paste was baked by heating at 800° C. for 15 minutes in the air, thereby completing a ceramic capacitor 4 with varistor function, comprising a plurality of inner electrode 2a on the surface of the grain boundary insulated semiconductor type ceramic sheets, the terminals of said inner electrodes 2a reaching to each of opposite edge of the sheet alternatively one by one; and outer electrode 3 at opposite edges of the semiconductor type ceramic sheets, said outer electrodes being connected electrically to the terminals of said inner electrodes 2a exposed to the edges of the sheets alternatively.

Figure 3:
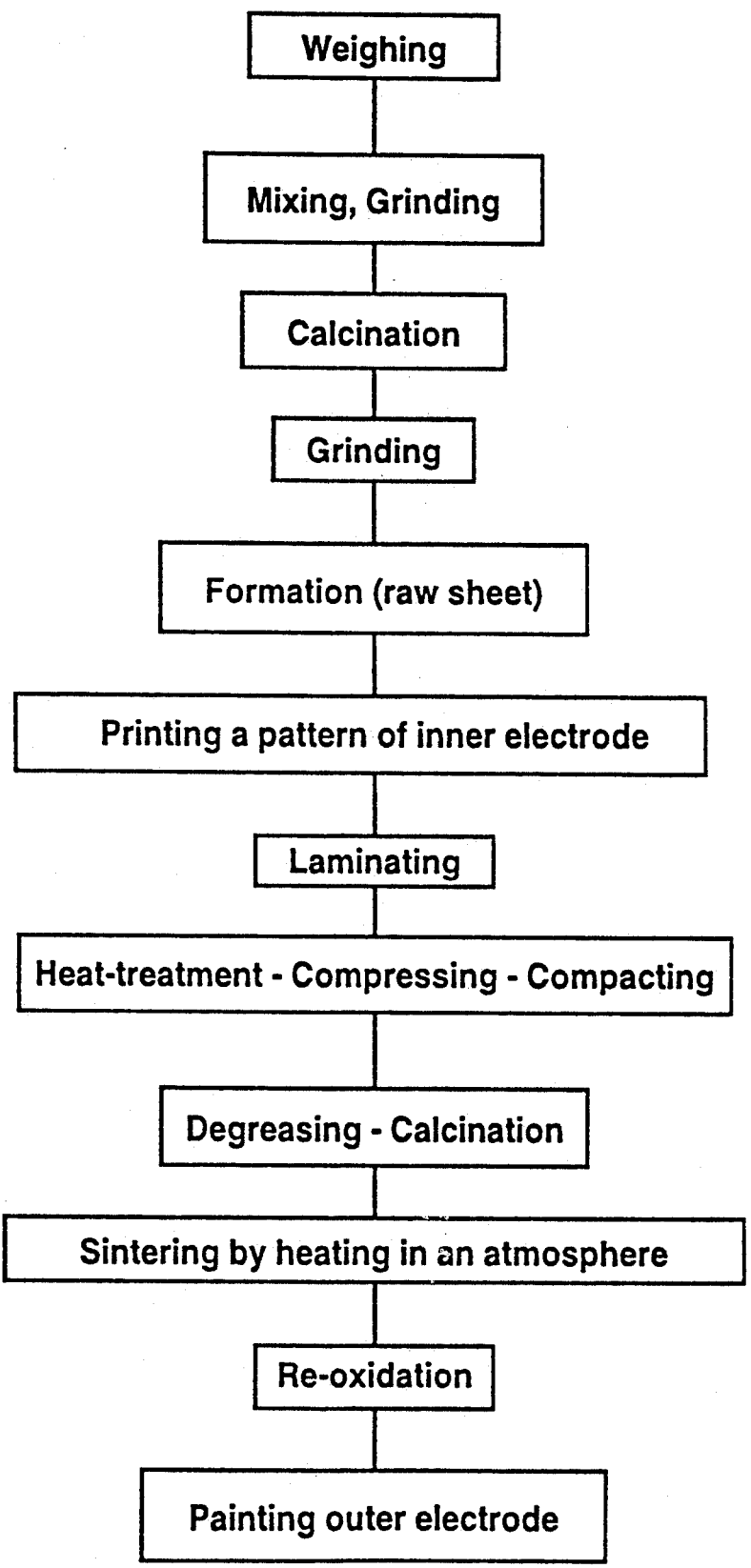
FIG. 3 is a flow chart showing the process to manufacture the laminated ceramic capacitor with varistor function to explain the examples of the present invention.

Size of the laminated ceramic capacitor of this example, abbreviated as Type 5.5, is 5.70 mm in width, 5.00 mm in length and 2.00 mm in thickness. The capacitor is composed of 10 effective sheets on which a pattern of inner electrodes is printed, and non-effective sheets on which the pattern of inner electrode is not printed, wherein both types of sheets are laminated alternatively, one by one. FIG. 3 shows a manufacturing process flow sheet of the present invention.

According to the laminated ceramic capacitor with varistor function thus manufactured, electrical characteristics such as capacitance, tan δ, varistor voltage, voltage non-linearity coefficient α, equivalent series resistance (ESR), capacitance-temperature rate of change and temperature coefficient of varistor voltage are listed in Tables 1-15. The experimental conditions for sample preparation were; 1200° C., 2 hours for calcination and degreasing in the air; 1300° C., 2 hours for sintering in the reducing atmosphere of $N_2:H_2=99:1$; and 1100° C., 1 hour for re-oxidation.

Each electrical characteristic was obtained by the following experimental conditions.

* Capacitance was measured at 1.0 V, 1.0 KHz.
* Varistor voltage $V_{0.1mA}$ was measured at 0.1 mA.
* Voltage non-linearity coefficient α was calculated from the values of varistor voltage measured at 0.1 mA and 1.0 mA, respectively, using the following equation $$\alpha = 1/\log(V_{1.0mA}/V_{0.1mA})$$

* Equivalent series resistance (ESR) is defined as resistance at resonance frequency measured at 1.0 V.
* Capacitance-temperature rate of change (ΔC/C) was calculated from the values measured at −25° C. and 85° C., respectively.
* Temperature coefficient of varistor voltage (ΔV/V) was calculated from the values measured at 25° C. and 50° C., respectively.

TABLE 1

$Sr_{0.8}Ba_{0.2}TiO_3$ (A/B = 0.95)
$Nb_2O_5$; 0.05 mol %
The relative molar contents of $MnO_2$ and $SiO_2$ are made equal.

| Sample Number | $MnO_2$ + $SiO_2$ (mol %) | C (nF) | tan δ (%) | $V_{0.1\ mA}$ (V) | α | ESR (m Ω) | ΔC/C (%) | ΔV/V (%/°C.) |
|---|---|---|---|---|---|---|---|---|
| *1 | 0.0 | 0.3 | 1.3 | 531 | 1 | 2.0k | −12.4 | −10.5 |
| *2 | 0.1 | 0.8 | 1.2 | 119 | 2 | 1.2k | −9.1 | −5.3 |
| 3 | 0.2 | 12 | 1.5 | 21 | 3 | 391 | −5.3 | −1.8 |
| 4 | 0.5 | 90 | 1.5 | 13 | 4 | 93 | −4.5 | −1.5 |
| 5 | 1.0 | 357 | 1.7 | 7 | 8 | 47 | −4.1 | −1.3 |
| 6 | 2.0 | 476 | 1.7 | 4 | 11 | 35 | −4.0 | −1.5 |
| 7 | 3.0 | 341 | 1.8 | 7 | 8 | 50 | −3.2 | −1.5 |
| 8 | 4.0 | 102 | 1.7 | 11 | 6 | 148 | −4.6 | −1.4 |
| 9 | 5.0 | 12 | 1.2 | 19 | 3 | 371 | −6.4 | −1.6 |
| *10 | 6.0 | 0.8 | 1.9 | 121 | 2 | 1.5k | −11.3 | −6.1 |

Those marked by the symbol * in the tables are listed for comparison and not included in the range of claims in the present invention.

TABLE 2

$Sr_{0.8}Ba_{0.2}TiO_3$ (A/B = 0.95)
$Nb_2O_5$; 0.1 mol %
The relative molar contents of $MnO_2$ and $SiO_2$ are made equal.

| Sample Number | $MnO_2$ + $SiO_2$ (mol %) | C (nF) | tan δ (%) | $V_{0.1\ mA}$ (V) | α | ESR (m Ω) | ΔC/C (%) | ΔV/V (%/°C.) |
|---|---|---|---|---|---|---|---|---|
| *11 | 0.0 | 0.3 | 1.5 | 511 | 1 | 2.0k | −11.2 | −11.5 |
| *12 | 0.1 | 0.8 | 1.3 | 119 | 2 | 1.2k | −8.7 | −7.3 |
| 13 | 0.2 | 12 | 1.3 | 19 | 3 | 367 | −5.4 | −1.5 |
| 14 | 0.5 | 91 | 1.5 | 14 | 4 | 93 | −4.1 | −1.5 |
| 15 | 1.0 | 366 | 1.2 | 7 | 8 | 46 | −5.5 | −1.4 |
| 16 | 2.0 | 479 | 1.4 | 4 | 11 | 37 | −4.2 | −1.3 |
| 17 | 3.0 | 340 | 1.4 | 8 | 8 | 51 | −3.5 | −1.4 |
| 18 | 4.0 | 105 | 1.5 | 11 | 6 | 80 | −3.5 | −1.3 |
| 19 | 5.0 | 12 | 1.5 | 22 | 3 | 359 | −5.4 | −1.7 |
| *20 | 6.0 | 0.8 | 1.9 | 127 | 2 | 1.5k | −8.7 | −7.6 |

Those marked by the symbol * in the tables are listed for comparison and not included in the range of claims in the present invention.

TABLE 3

$Sr_{0.8}Ba_{0.2}TiO_3$ (A/B = 0.95)
$Nb_2O_5$; 0.5 mol %
The relative molar contents of $MnO_2$ and $SiO_2$ are made equal.

| Sample Number | $MnO_2$ + $SiO_2$ (mol %) | C (nF) | tan δ (%) | $V_{0.1\ mA}$ (V) | α | ESR (m Ω) | ΔC/C (%) | ΔV/V (%/°C.) |
|---|---|---|---|---|---|---|---|---|
| *21 | 0.0 | 0.3 | 1.4 | 451 | 1 | 2.0k | −10.6 | −8.5 |
| *22 | 0.1 | 3 | 1.7 | 32 | 3 | 667 | −8.4 | −3.1 |
| 23 | 0.2 | 14 | 1.8 | 19 | 4 | 304 | −5.0 | −1.4 |
| 24 | 0.5 | 99 | 1.5 | 12 | 4 | 72 | −4.1 | −1.2 |
| 25 | 1.0 | 383 | 1.5 | 6 | 8 | 43 | −4.2 | −1.3 |
| 26 | 2.0 | 496 | 1.5 | 4 | 11 | 36 | −3.3 | −1.2 |

TABLE 3-continued $Sr_{0.8}Ba_{0.2}TiO_3$ (A/B = 0.95)
$Nb_2O_5$; 0.5 mol %
The relative molar contents of $MnO_2$ and $SiO_2$ are made equal.

| Sample Number | $MnO_2 + SiO_2$ (mol %) | C (nF) | tan δ (%) | $V_{0.1 mA}$ (V) | α | ESR (mΩ) | ΔC/C (%) | ΔV/V (%/°C.) |
|---|---|---|---|---|---|---|---|---|
| 27 | 3.0 | 357 | 1.4 | 7 | 8 | 48 | −3.1 | −1.5 |
| 28 | 4.0 | 128 | 1.3 | 9 | 6 | 68 | −4.2 | −1.3 |
| 29 | 5.0 | 15 | 1.4 | 20 | 4 | 301 | −6.5 | −1.6 |
| *30 | 6.0 | 3 | 1.9 | 31 | 3 | 682 | −10.2 | −4.7 |

Those marked by the symbol * in the tables are listed for comparison and not included in the range of claims in the present invention.

TABLE 4

$Sr_{0.8}Ba_{0.2}TiO_3$ (A/B = 0.95)
$Nb_2O_5$; 1.0 mol %
The relative molar contents of $MnO_2$ and $SiO_2$ are made equal.

| Sample Number | $MnO_2 + SiO_2$ (mol %) | C (nF) | tan δ (%) | $V_{0.1 mA}$ (V) | α | ESR (mΩ) | ΔC/C (%) | ΔV/V (%/°C.) |
|---|---|---|---|---|---|---|---|---|
| *31 | 0.0 | 0.3 | 1.5 | 421 | 1 | 2.0k | −9.9 | −7.9 |
| *32 | 0.1 | 4 | 1.3 | 23 | 3 | 534 | −8.1 | −2.8 |
| 33 | 0.2 | 22 | 1.5 | 11 | 5 | 172 | −4.2 | −1.2 |
| 34 | 0.5 | 128 | 1.4 | 9 | 5 | 67 | −3.4 | −1.4 |
| 35 | 1.0 | 394 | 1.1 | 6 | 9 | 43 | −4.0 | −1.3 |
| 36 | 2.0 | 524 | 1.5 | 4 | 13 | 31 | −3.2 | −1.1 |
| 37 | 3.0 | 382 | 1.3 | 6 | 8 | 43 | −3.5 | −1.7 |
| 38 | 4.0 | 136 | 1.3 | 8 | 7 | 62 | −4.1 | −1.3 |
| 39 | 5.0 | 25 | 1.2 | 11 | 5 | 165 | −6.5 | −1.5 |
| *40 | 6.0 | 4 | 1.3 | 24 | 3 | 532 | −9.6 | −4.3 |

Those marked by the symbol * in the tables are listed for comparison and not included in the range of claims in the present invention.

TABLE 5

$Sr_{0.8}Ba_{0.2}TiO_3$ (A/B = 0.95)
$Nb_2O_5$; 2.0 mol %
The relative molar contents of $MnO_2$ and $SiO_2$ are made equal.

| Sample Number | $MnO_2 + SiO_2$ (mol %) | C (nF) | tan δ (%) | $V_{0.1 mA}$ (V) | α | ESR (mΩ) | ΔC/C (%) | ΔV/V (%/°C.) |
|---|---|---|---|---|---|---|---|---|
| *41 | 0.0 | 0.3 | 1.6 | 513 | 1 | 2.0k | −11.1 | −11.5 |
| *42 | 0.1 | 0.8 | 1.3 | 115 | 2 | 1.2k | −8.5 | −7.2 |
| 43 | 0.2 | 12 | 1.3 | 21 | 3 | 363 | −5.3 | −1.6 |
| 44 | 0.5 | 92 | 1.4 | 13 | 5 | 91 | −4.2 | −1.4 |
| 45 | 1.0 | 371 | 1.5 | 7 | 7 | 44 | −5.3 | −1.2 |
| 46 | 2.0 | 490 | 1.4 | 4 | 10 | 34 | −4.4 | −1.3 |
| 47 | 3.0 | 345 | 1.3 | 7 | 7 | 48 | −3.6 | −1.4 |
| 48 | 4.0 | 111 | 1.5 | 11 | 5 | 80 | −3.5 | −1.3 |
| 49 | 5.0 | 12 | 1.3 | 21 | 3 | 357 | −5.6 | −1.6 |
| *50 | 6.0 | 0.8 | 1.9 | 114 | 2 | 1.5k | −8.9 | −7.7 |

Those marked by the symbol * in the tables are listed for comparison and not included in the range of claims in the present invention.

TABLE 6

$Sr_{0.8}Ba_{0.2}TiO_3$ (A/B = 0.97)
$Nb_2O_5$; 0.05 mol %
The relative molar contents of $MnO_2$ and $SiO_2$ are made equal.

| Sample Number | $MnO_2 + SiO_2$ (mol %) | C (nF) | tan δ (%) | $V_{0.1 mA}$ (V) | α | ESR (mΩ) | ΔC/C (%) | ΔV/V (%/°C.) |
|---|---|---|---|---|---|---|---|---|
| *51 | 0.0 | 0.3 | 1.3 | 451 | 1 | 2.0k | −9.9 | −8.3 |
| *52 | 0.1 | 1 | 1.4 | 90 | 2 | 1.0k | −7.3 | −3.1 |
| 53 | 0.2 | 15 | 1.5 | 16 | 4 | 278 | −4.2 | −1.3 |
| 54 | 0.5 | 124 | 1.3 | 10 | 6 | 71 | −4.4 | −1.4 |
| 55 | 1.0 | 476 | 1.2 | 5 | 9 | 35 | −4.1 | −1.1 |
| 56 | 2.0 | 631 | 1.4 | 4 | 13 | 28 | −3.1 | −1.3 |
| 57 | 3.0 | 456 | 1.5 | 5 | 9 | 39 | −3.2 | −1.5 |
| 58 | 4.0 | 150 | 1.4 | 9 | 7 | 62 | −4.2 | −1.3 |
| 59 | 5.0 | 17 | 1.5 | 16 | 4 | 248 | −5.4 | −1.5 |
| *60 | 6.0 | 1 | 1.7 | 81 | 2 | 1.0k | −9.3 | −5.1 |

Those marked by the symbol * in the tables are listed for comparison and not included in the range of claims in the present invention.

TABLE 7

$Sr_{0.8}Ba_{0.2}TiO_3$ (A/B = 0.97)
$Nb_2O_5$; 0.1 mol %
The relative molar contents of $MnO_2$ and $SiO_2$ are made equal.

| Sample Number | $MnO_2 + SiO_2$ (mol %) | C (nF) | tan δ (%) | $V_{0.1\,mA}$ (V) | α | ESR (m Ω) | ΔC/C (%) | ΔV/V (%/°C.) |
|---|---|---|---|---|---|---|---|---|
| *61 | 0.0 | 0.4 | 1.2 | 402 | 1 | 2.0k | −10.2 | −7.1 |
| *62 | 0.1 | 1 | 1.3 | 91 | 2 | 1.0k | −7.2 | −3.0 |
| 63 | 0.2 | 15 | 1.4 | 16 | 4 | 270 | −4.0 | −1.2 |
| 64 | 0.5 | 121 | 1.4 | 10 | 6 | 72 | −4.1 | −1.6 |
| 65 | 1.0 | 486 | 1.3 | 5 | 10 | 35 | −4.1 | −1.1 |
| 66 | 2.0 | 641 | 1.5 | 4 | 13 | 28 | −3.3 | −1.4 |
| 67 | 3.0 | 451 | 1.3 | 5 | 10 | 37 | −3.0 | −1.4 |
| 68 | 4.0 | 141 | 1.6 | 9 | 7 | 60 | −3.7 | −1.3 |
| 69 | 5.0 | 15 | 1.4 | 17 | 4 | 271 | −4.8 | −1.5 |
| *70 | 6.0 | 1 | 1.8 | 85 | 1 | 1.0k | −8.9 | −5.1 |

Those marked by the symbol * in the tables are listed for comparison and not included in the range of claims in the present invention.

TABLE 8

$Sr_{0.8}Ba_{0.2}TiO_3$ (A/B = 0.97)
$Nb_2O_5$; 0.5 mol %
The relative molar contents of $MnO_2$ and $SiO_2$ are made equal.

| Sample Number | $MnO_2 + SiO_2$ (mol %) | C (nF) | tan δ (%) | $V_{0.1\,mA}$ (V) | α | ESR (m Ω) | ΔC/C (%) | ΔV/V (%/°C.) |
|---|---|---|---|---|---|---|---|---|
| *71 | 0.0 | 0.4 | 1.2 | 402 | 1 | 2.0k | −9.9 | −6.1 |
| *72 | 0.1 | 4 | 1.3 | 23 | 3 | 501 | −6.8 | −4.3 |
| 73 | 0.2 | 19 | 1.3 | 14 | 5 | 228 | −4.1 | −1.2 |
| 74 | 0.5 | 151 | 1.3 | 8 | 6 | 54 | −3.8 | −1.6 |
| 75 | 1.0 | 519 | 1.3 | 5 | 11 | 35 | −3.8 | −1.2 |
| 76 | 2.0 | 663 | 1.4 | 4 | 14 | 27 | −3.1 | −1.2 |
| 77 | 3.0 | 481 | 1.4 | 5 | 10 | 35 | −2.9 | −1.2 |
| 78 | 4.0 | 180 | 1.5 | 6 | 8 | 51 | −3.4 | −1.2 |
| 79 | 5.0 | 19 | 1.3 | 14 | 5 | 228 | −4.7 | −1.3 |
| *80 | 6.0 | 4 | 1.9 | 22 | 3 | 501 | −8.8 | −5.5 |

Those marked by the symbol * in the tables are listed for comparison and not included in the range of claims in the present invention.

TABLE 9

$Sr_{0.8}Ba_{0.2}TiO_3$ (A/B = 0.97)
$Nb_2O_5$; 1.0 mol %
The relative molar contents of $MnO_2$ and $SiO_2$ are made equal.

| Sample Number | $MnO_2 + SiO_2$ (mol %) | C (nF) | tan δ (%) | $V_{0.1\,mA}$ (V) | α | ESR (m Ω) | ΔC/C (%) | ΔV/V (%/°C.) |
|---|---|---|---|---|---|---|---|---|
| *81 | 0.0 | 0.4 | 1.3 | 405 | 1 | 2.0k | −8.8 | −6.1 |
| *82 | 0.1 | 5 | 1.4 | 19 | 4 | 399 | −7.1 | −3.1 |
| 83 | 0.2 | 36 | 1.3 | 9 | 6 | 125 | −3.5 | −1.2 |
| 84 | 0.5 | 170 | 1.3 | 7 | 7 | 51 | −3.4 | −1.3 |
| 85 | 1.0 | 530 | 1.3 | 5 | 12 | 31 | −3.5 | −1.1 |
| 86 | 2.0 | 706 | 1.5 | 4 | 17 | 24 | −3.5 | −1.2 |
| 87 | 3.0 | 507 | 1.3 | 5 | 10 | 34 | −3.0 | −1.2 |
| 88 | 4.0 | 184 | 1.4 | 6 | 9 | 47 | −3.4 | −1.2 |
| 89 | 5.0 | 39 | 1.3 | 8 | 6 | 126 | −4.1 | −1.2 |
| *90 | 6.0 | 5 | 1.9 | 20 | 4 | 392 | −8.6 | −5.9 |

Those marked by the symbol * in the tables are listed for comparison and not included in the range of claims in the present invention.

TABLE 10

$Sr_{0.8}Ba_{0.2}TiO_3$ (A/B = 0.97)
$Nb_2O_5$; 2.0 mol %
The relative molar contents of $MnO_2$ and $SiO_2$ are made equal.

| Sample Number | $MnO_2 + SiO_2$ (mol %) | C (nF) | tan δ (%) | $V_{0.1\,mA}$ (V) | α | ESR (m Ω) | ΔC/C (%) | ΔV/V (%/°C.) |
|---|---|---|---|---|---|---|---|---|
| *91 | 0.0 | 0.3 | 1.5 | 453 | 1 | 2.0k | −10.5 | −7.8 |
| *92 | 0.1 | 1 | 1.3 | 92 | 2 | 1.0k | −7.4 | −4.1 |
| 93 | 0.2 | 15 | 1.3 | 17 | 4 | 272 | −4.4 | −1.3 |
| 94 | 0.5 | 122 | 1.4 | 19 | 6 | 68 | −4.0 | −1.4 |
| 95 | 1.0 | 490 | 1.3 | 5 | 9 | 35 | −4.3 | −1.4 |
| 96 | 2.0 | 653 | 1.5 | 4 | 13 | 24 | −3.8 | −1.3 |
| 97 | 3.0 | 459 | 1.4 | 5 | 9 | 36 | −3.4 | −1.5 |
| 98 | 4.0 | 143 | 1.3 | 9 | 7 | 60 | −4.1 | −1.3 |
| 99 | 5.0 | 18 | 1.4 | 17 | 4 | 269 | −5.8 | −1.5 |

TABLE 10-continued $Sr_{0.8}Ba_{0.2}TiO_3$ (A/B = 0.97)
$Nb_2O_5$; 2.0 mol %
The relative molar contents of $MnO_2$ and $SiO_2$ are made equal.

| Sample Number | $MnO_2 + SiO_2$ (mol %) | C (nF) | tan δ (%) | $V_{0.1\,mA}$ (V) | α | ESR (m Ω) | ΔC/C (%) | ΔV/V (%/°C.) |
|---|---|---|---|---|---|---|---|---|
| *100 | 6.0 | 1 | 1.8 | 91 | 2 | 1.0k | −9.9 | −5.7 |

Those marked by the symbol * in the tables are listed for comparison and not included in the range of claims in the present invention.

TABLE 11

$Sr_{0.8}Ba_{0.2}TiO_3$ (A/B = 0.99)
$Nb_2O_5$; 0.05 mol %
The relative molar contents of $MnO_2$ and $SiO_2$ are made equal.

| Sample Number | $MnO_2 + SiO_2$ (mol %) | C (nF) | tan δ (%) | $V_{0.1\,mA}$ (V) | α | ESR (m Ω) | ΔC/C (%) | ΔV/V (%/°C.) |
|---|---|---|---|---|---|---|---|---|
| *101 | 0.0 | 0.3 | 1.5 | 499 | 1 | 2.0k | −10.6 | −10.1 |
| *102 | 0.1 | 0.6 | 1.3 | 151 | 1 | 1.5k | −9.4 | −1.5 |
| 103 | 0.2 | 9 | 1.4 | 21 | 2 | 474 | −5.2 | −1.3 |
| 104 | 0.5 | 68 | 1.5 | 12 | 3 | 122 | −4.5 | −1.3 |
| 105 | 1.0 | 275 | 1.4 | 8 | 5 | 64 | −4.4 | −1.4 |
| 106 | 2.0 | 362 | 1.4 | 5 | 7 | 48 | −4.6 | −1.5 |
| 107 | 3.0 | 262 | 1.4 | 8 | 5 | 64 | −4.8 | −1.3 |
| 108 | 4.0 | 78 | 1.5 | 11 | 4 | 111 | −5.5 | −1.3 |
| 109 | 5.0 | 9 | 1.4 | 22 | 2 | 472 | −6.5 | −1.5 |
| *110 | 6.0 | 0.6 | 1.8 | 151 | 1 | 1.5k | −8.9 | −10.0 |

Those marked by the symbol * in the tables are listed for comparison and not included in the range of claims in the present invention.

TABLE 12

$Sr_{0.8}Ba_{0.2}TiO_3$ (A/B = 0.99)
$Nb_2O_5$; 0.1 mol %
The relative molar contents of $MnO_2$ and $SiO_2$ are made equal.

| Sample Number | $MnO_2 + SiO_2$ (mol %) | C (nF) | tan δ (%) | $V_{0.1\,mA}$ (V) | α | ESR (m Ω) | ΔC/C (%) | ΔV/V (%/°C.) |
|---|---|---|---|---|---|---|---|---|
| *111 | 0.0 | 0.3 | 1.5 | 500 | 1 | 2.0k | −10.5 | −9.9 |
| *112 | 0.1 | 0.6 | 1.4 | 144 | 1 | 1.5k | −9.0 | −1.4 |
| 113 | 0.2 | 9 | 1.4 | 21 | 2 | 473 | −5.1 | −1.4 |
| 114 | 0.5 | 70 | 1.4 | 15 | 4 | 134 | −4.4 | −1.5 |
| 115 | 1.0 | 277 | 1.3 | 9 | 6 | 63 | −4.3 | −1.4 |
| 116 | 2.0 | 364 | 1.4 | 5 | 7 | 44 | −4.3 | −1.4 |
| 117 | 3.0 | 262 | 1.4 | 9 | 6 | 65 | −4.9 | −1.4 |
| 118 | 4.0 | 80 | 1.5 | 11 | 4 | 108 | −5.2 | −1.3 |
| 119 | 5.0 | 9 | 1.3 | 21 | 2 | 470 | −5.8 | −1.4 |
| *120 | 6.0 | 0.6 | 1.9 | 139 | 1 | 1.5k | −10.1 | −9.6 |

Those marked by the symbol * in the tables are listed for comparison and not included in the range of claims in the present invention.

TABLE 13

$Sr_{0.8}Ba_{0.2}TiO_3$ (A/B = 0.99)
$Nb_2O_5$; 0.5 mol %
The relative molar contents of $MnO_2$ and $SiO_2$ are made equal.

| Sample Number | $MnO_2 + SiO_2$ (mol %) | C (nF) | tan δ (%) | $V_{0.1\,mA}$ (V) | α | ESR (m Ω) | ΔC/C (%) | ΔV/V (%/°C.) |
|---|---|---|---|---|---|---|---|---|
| *121 | 0.0 | 0.3 | 1.4 | 450 | 1 | 2.0k | −9.5 | −8.9 |
| *122 | 0.1 | 2 | 1.4 | 35 | 2 | 871 | −5.7 | −1.4 |
| 123 | 0.2 | 10 | 1.3 | 21 | 3 | 389 | −4.8 | −1.3 |
| 124 | 0.5 | 87 | 1.3 | 11 | 4 | 97 | −4.1 | −1.3 |
| 125 | 1.0 | 294 | 1.3 | 9 | 6 | 57 | −4.0 | −1.3 |
| 126 | 2.0 | 376 | 1.3 | 5 | 8 | 46 | −4.2 | −1.4 |
| 127 | 3.0 | 269 | 1.3 | 9 | 6 | 63 | −3.8 | −1.3 |
| 128 | 4.0 | 57 | 1.4 | 10 | 5 | 88 | −4.2 | −1.4 |
| 129 | 5.0 | 10 | 1.3 | 21 | 3 | 387 | −5.5 | −1.4 |
| *130 | 6.0 | 2 | 1.9 | 34 | 2 | 877 | −9.5 | −9.4 |

Those marked by the symbol * in the tables are listed for comparison and not included in the range of claims in the present invention.

TABLE 14

$Sr_{0.8}Ba_{0.2}TiO_3$ (A/B = 0.99)
$Nb_2O_5$; 1.0 mol %
The relative molar contents of $MnO_2$ and $SiO_2$ are made equal.

| Sample Number | $MnO_2 + SiO_2$ (mol %) | C (nF) | tan δ (%) | $V_{0.1\ mA}$ (V) | α | ESR (m Ω) | ΔC/C (%) | ΔV/V (%/°C.) |
|---|---|---|---|---|---|---|---|---|
| *131 | 0.0 | 0.3 | 1.4 | 451 | 1 | 2.0k | −9.3 | −9.5 |
| *132 | 0.1 | 3 | 1.4 | 32 | 2 | 702 | −4.8 | −1.3 |
| 133 | 0.2 | 19 | 1.3 | 15 | 4 | 217 | −4.5 | −1.3 |
| 134 | 0.5 | 97 | 1.3 | 12 | 4 | 89 | −4.1 | −1.4 |
| 135 | 1.0 | 301 | 1.2 | 8 | 7 | 55 | −3.9 | −1.3 |
| 136 | 2.0 | 400 | 1.2 | 5 | 10 | 41 | −3.8 | −1.3 |
| 137 | 3.0 | 292 | 1.2 | 9 | 6 | 59 | −3.7 | −1.3 |
| 138 | 4.0 | 107 | 1.3 | 10 | 5 | 80 | −4.1 | −1.2 |
| 139 | 5.0 | 19 | 1.3 | 14 | 4 | 217 | −4.7 | −1.3 |
| *140 | 6.0 | 3 | 1.9 | 30 | 2 | 708 | −7.1 | −9.4 |

Those marked by the symbol * in the tables are listed for comparison and not included in the range of claims in the present invention.

TABLE 15

$Sr_{0.8}Ba_{0.2}TiO_3$ (A/B = 0.99)
$Nb_2O_5$; 2.0 mol %
The relative molar contents of $MnO_2$ and $SiO_2$ are made equal.

| Sample Number | $MnO_2 + SiO_2$ (mol %) | C (nF) | tan δ (%) | $V_{0.1\ mA}$ (V) | α | ESR (m Ω) | ΔC/C (%) | ΔV/V (%/°C.) |
|---|---|---|---|---|---|---|---|---|
| *141 | 0.0 | 0.3 | 1.6 | 501 | 1 | 2.0k | −10.2 | −9.6 |
| *142 | 0.1 | 0.6 | 1.4 | 142 | 1 | 1.5k | −9.5 | −1.5 |
| 143 | 0.2 | 9 | 1.4 | 19 | 2 | 474 | −5.3 | −1.3 |
| 144 | 0.5 | 70 | 1.4 | 13 | 4 | 120 | −4.5 | −1.3 |
| 145 | 1.0 | 282 | 1.4 | 9 | 6 | 61 | −4.3 | −1.4 |
| 146 | 2.0 | 372 | 1.4 | 5 | 7 | 47 | −4.3 | −1.4 |
| 147 | 3.0 | 262 | 1.4 | 8 | 6 | 64 | −4.9 | −1.3 |
| 148 | 4.0 | 82 | 1.5 | 11 | 4 | 109 | −5.6 | −1.3 |
| 149 | 5.0 | 9 | 1.5 | 21 | 2 | 472 | −6.1 | −1.6 |
| *150 | 6.0 | 0.6 | 1.6 | 142 | 1 | 1.5k | −9.8 | −9.9 |

Those marked by the symbol * in the tables are listed for comparison and not included in the range of claims in the present invention.

Next, the data listed in Tables 1-15 show the effect of A/B ratio of $Sr_{(1-x)}Ba_xTiO_3$ and the effect of the amount of added second component, $MnO_2$ and $SiO_2$, to the characteristics of the capacitor.

The samples marked by the symbol * in the tables are listed for comparison and they are not included in the range of claims in the present invention. The sintered bodies marked by the symbol * possess small capacitance, small value of voltage non-linearity coefficient α, which is a representative characteristic of varistors, and a large value of equivalent series resistance (ESR). The capacitor having the above-discussed characteristics cannot display the performances both of a normal capacitor, which absorbs low voltage noises and high frequency noises, and of a varistor which absorbs high voltage pulses and electrostatic charges, at the same time. The capacitor has relatively large capacitance-temperature rate of variation and varistor voltage temperature coefficient, whereby making reliability and electric characteristics of the capacitor liable to be affected by temperature change. Therefore, these samples are not suited for the use of a ceramic capacitor with varistor function which protects electronic devices and equipment from being damaged by abnormal voltage such as noises, pulses and electrostatic charge generated by surrounding electronic equipment. Other samples which are not marked in the tables, possess large capacitance, large value of voltage non-linearity coefficient α and small equivalent series resistance (ESR). A capacitor with these characteristics displays the performances both of a normal capacitor, which absorbs low voltage noises and high frequency noises, and of a varistor which absorbs high voltage pulses and electrostatic charges. The capacitor has relatively small capacitance-temperature rate of variation and varistor voltage temperature coefficient, thereby making reliability and electric characteristics of the capacitor hardly liable to be affected by temperature change. Therefore, these samples are well suited for the use of a ceramic capacitor with varistor function which protects electronic devices and equipment from being damaged by abnormal voltage such as noises, pulses and electrostatic charge generated by surrounding electronic equipment.

In the present invention, A/B ratio is controlled because, when A/B ratio is greater than 1.00, the amount of $Sr_{(1-x)}Ba_x$ will be in excess relative to the amount of Ti, thereby preventing the formation of the liquid phase composed of Mn, Si and Ti ternary oxide system. Grain boundary insulated structure of the ceramics is difficult to be formed with abovementioned composition and, moreover, oxidation and diffusion of the materials of the inner electrode occur, resulting in poor electric characteristics and reliability. On the other hand, when A/B ratio is less than 0.95, the sintered body obtained will be porous and sintering density decreases. Powder materials of its mean particle size of 0.5 μm or less was used for the starting material of laminated ceramic capacitor with varistor function because, if the powder of mean particle size of more than 0.5 μm or is used, the particles tend to coagulate in the slurry, thereby making the surface of raw sheets formed by using such non-uniform slurry gritty and not smooth. Sintering density and packing density of the sintered body obtained are small and the sintered body is difficult to make semiconductive, thereby electric characteristics of the ceramic capacitor tends to be unstable.

Next, total amount of the second component added, $MnO_2$ and $SiO_2$, are also controlled because, when the combined relative molar content of the second component is less than 0.2%, the effect of the added material is hardly reflected in the formation of the liquid phase composed of Mn, Si and Ti ternary oxide system. Grain boundary insulated structure of the ceramics is difficult to form, thereby sintering density of the ceramic capacitor obtained is decreased and electric characteristics tend to be poor. On the other hand, when the relative molar content of the second component added exceeds 5.0%, the amount of metal oxides with high electric resistance segregating in the grain boundaries increases and electric characteristics of the ceramic capacitor also degrades.

The process of calcination and degreasing by heating the raw sheet at 600°-1250° C. in the air is most important in the method of formation of a laminated ceramic capacitor with varistor function in the present invention. Most of electric characteristics and reliability of the ceramic capacitor with varistor function manufactured are determined during this process. The purposes of the process are to enhance adhesive force between the material of ceramic capacitor with varistor function and material of the inner electrode, and to adjust sintering density, uniformity in the texture of sintered body, and mean grain size of the crystal particles in the grain boundary insulated semiconductor type ceramics of the laminated ceramic capacitor with varistor function. The rate of temperature increase was adjusted to 200° C./hr or less in the degreasing and calcination process because the slower the temperature increase was, the more desirable results were obtained after the degreasing and calcination process.

The temperature for degreasing and calcination in the air is limited between 600° and 1250° C. When the temperature is lower than 600° C., the process is not effective enough and when the temperature for calcination exceeds 1250° C., electric characteristics and reliability of the capacitor will be largely decreased because of the following reasons;

(1) The ceramic capacitor with varistor function is sintered instead of being calcinated by heating at this high temperature range. When the capacitor sintered previously in the air is subjected to sintering in the reducing atmosphere or in the nitrogen atmosphere, the sintered body shrinks rapidly and suffers by concentrated stress, thereby producing de-lamination and cracks in the laminated ceramic capacitor with varistor function.

(2) Oxidation of Ni as well as sintering of ceramic capacitor with varistor function will proceed at the same time when Ni is used as a material for inner electrode. The sintered body reacts with Ni followed by the diffusion of Ni, resulting in breaking of inner electrode, de-lamination and formation of cracks in the laminated ceramic capacitor with varistor function.

(3) Sintering in the liquid phase of Mn, Si and Ti ternary oxide system proceed rapidly under the sintering condition at high temperature over 1250° C. and growth of grains is accelerated, thereby largely decreasing sintering density and packing density.

(4) The sintered body treated by above-mentioned manner is difficult to make semiconductive by the sintering process in reducing or nitrogen atmosphere afterward.

The laminated ceramic capacitor with varistor function thus manufactured has larger capacitance and displays much better temperature and frequency characteristics than the capacitor disclosed in aforementioned Japanese Laid-Open Patent Publication No. 58-23921. The ceramic capacitor in the present invention is manufactured by laminating ceramic capacitor materials with varistor function which possesses both functions of a normal capacitor which absorbs noises, and of a varistor which absorbs pulses and electrostatic charge, while the above-mentioned capacitor in the prior art is simply made of piled varistor material which shows prominent absorbing ability for surge current. The laminated ceramic capacitor with varistor function in the present invention is distinct from that in the prior art in both its functions and uses.

EXAMPLE 2

It was found from Example 1 that the amount of the added second component, the combined amount of $MnO_2$ and $SiO_2$, should be in the range of relative molar content of 0.2–5.0%. A laminated ceramic capacitor with varistor function was manufactured by using a similar method as described in Example 1, except that molar ratio of $MnO_2$ and $SiO_2$, the second components, was changed variously. A/B ratio in the perovskite structure of $Sr_{0.8}Ba_{0.2}TiO_3$ was fixed to 0.97 and relative molar content of $Nb_2O_5$ added as first component was fixed to 1.0%. The results are listed in Table 16.

TABLE 16

| | | | $Sr_{0.8}Ba_{0.2}TiO_3$ (A/B = 0.97) $Nb_2O_5$; 1.0 mol % | | | | | | |
|---|---|---|---|---|---|---|---|---|---|
| Sample Number | $MnO_2$ (mol %) | $SiO_2$ (mol %) | C (nF) | tan δ (%) | $V_{0.1\ mA}$ (V) | α | ESR (m Ω) | ΔC/C (%) | ΔV/V (%/°C.) |
| *151 | 2.0 | 0.0 | 0.3 | 2.5 | 452 | 1 | 2.0k | −10.2 | −7.2 |
| 152 | 1.8 | 0.2 | 10 | 1.3 | 14 | 4 | 400 | −5.4 | −1.5 |
| 153 | 1.5 | 0.5 | 733 | 1.4 | 4 | 18 | 22 | −3.5 | −1.2 |
| 154 | 1.0 | 1.0 | 706 | 1.5 | 4 | 17 | 24 | −3.5 | −1.2 |
| 155 | 0.5 | 1.5 | 184 | 1.3 | 4 | 7 | 50 | −4.6 | −1.5 |
| 156 | 0.2 | 1.8 | 9 | 1.8 | 18 | 4 | 400 | −6.5 | −1.7 |
| 157 | 0.0 | 2.0 | 0.3 | 1.9 | 452 | 1 | 2.0k | −10.5 | −8.3 |

Those marked by the symbol * in the tables are listed for comparison and not included in the range of claims in the present invention.

As is apparent from the experimental results in Table 16, both Mn and Si which convert into $MnO_2$ and $SiO_2$ in the sintering process are required for manufacturing the laminated ceramic capacitor with varistor function and an absence of one of the two compounds does not result in the formation of the same. The liquid phase composed of Mn, Si and Ti ternary oxide system is only allowed to form in the presence of the above-mentioned two compounds. A capacitor element having grain boundary insulated structure is formed readily when Mn, Si and Ti ternary oxide system segregates among grain boundaries and is made insulating by re-oxidization.

MnO$_2$ is preferably added in slight excess to obtain a capacitor of desirable electric characteristics such as capacitance, voltage non-linearity factor α and ESR.

EXAMPLE 3

A laminated ceramic capacitor was manufactured according to the methods described in Examples 1 and 2, except that the added amounts of first components which serve as a valency controlling agent were changed variously, i.e. Nb$_2$O$_5$, Ta$_2$O$_5$, V$_2$O$_5$, W$_2$O$_5$, Dy$_2$O$_3$, Nd$_2$O$_3$, Y$_2$O$_3$, La$_2$O$_3$ or CeO$_2$. A/B ratio of Sr$_{0.8}$Ba$_{0.2}$TiO$_3$ was fixed to 0.97 while combined relative molar content of second components was fixed to 1.0% for MnO$_2$ and 1.0% for SiO$_2$, the total amount of which was fixed to 2.0%. The results are described in Tables 17–25.

TABLE 17

Sr$_{0.8}$Ba$_{0.2}$TiO$_3$ (A/B = 0.97)
MnO$_2$: 1.0 mol %, SiO$_2$: 1.0 mol %

| Sample Number | Ta$_2$O$_5$ (mol %) | C (nF) | tan δ (%) | V$_{0.1\,mA}$ (V) | α | ESR (m Ω) | ΔC/C (%) | ΔV/V (%/°C.) |
|---|---|---|---|---|---|---|---|---|
| *158 | 0.02 | 0.3 | 2.0 | 450 | 1 | 2.0k | −8.9 | −7.5 |
| 159 | 0.05 | 626 | 1.5 | 4 | 13 | 27 | −3.8 | −1.5 |
| 160 | 0.1 | 644 | 1.4 | 4 | 13 | 27 | −3.5 | −1.5 |
| 161 | 0.5 | 672 | 1.4 | 4 | 14 | 26 | −3.4 | −1.3 |
| 162 | 1.0 | 697 | 1.4 | 4 | 17 | 25 | −3.6 | −1.3 |
| 163 | 2.0 | 605 | 1.5 | 4 | 13 | 27 | −3.7 | −1.3 |
| *164 | 3.0 | 4 | 2.1 | 24 | 3 | 260 | −10.8 | −7.5 |

Those marked by the symbol * in the tables are listed for comparison and not included in the range of claims in the present invention.

TABLE 18

Sr$_{0.8}$Ba$_{0.2}$TiO$_3$ (A/B = 0.97)
MnO$_2$: 1.0 mol %, SiO$_2$: 1.0 mol %

| Sample Number | V$_2$O$_5$ (mol %) | C (nF) | tan δ (%) | V$_{0.1\,mA}$ (V) | α | ESR (m Ω) | ΔC/C (%) | ΔV/V (%/°C.) |
|---|---|---|---|---|---|---|---|---|
| *165 | 0.02 | 0.3 | 2.0 | 450 | 1 | 2.0k | −8.2 | −7.4 |
| 166 | 0.05 | 597 | 1.5 | 4 | 12 | 30 | −3.9 | −1.5 |
| 167 | 0.1 | 617 | 1.5 | 4 | 13 | 29 | −3.7 | −1.5 |
| 168 | 0.5 | 648 | 1.3 | 4 | 14 | 26 | −3.8 | −1.4 |
| 169 | 1.0 | 671 | 1.4 | 4 | 15 | 27 | −3.7 | −1.3 |
| 170 | 2.0 | 544 | 1.5 | 4 | 12 | 29 | −3.8 | −1.3 |
| *171 | 3.0 | 4 | 2.1 | 25 | 3 | 264 | −11.2 | −8.6 |

Those marked by the symbol * in the tables are listed for comparison and not included in the range of claims in the present invention.

TABLE 19

Sr$_{0.8}$Ba$_{0.2}$TiO$_3$ (A/B = 0.99)
MnO$_2$: 1.0 mol %, SiO$_2$: 1.0 mol %

| Sample Number | W$_2$O$_5$ (mol %) | C (nF) | tan δ (%) | V$_{0.1\,mA}$ (V) | α | ESR (m Ω) | ΔC/C (%) | ΔV/V (%/°C.) |
|---|---|---|---|---|---|---|---|---|
| *172 | 0.02 | 0.3 | 2.0 | 450 | 1 | 2.0k | −8.1 | −7.4 |
| 173 | 0.05 | 595 | 1.5 | 4 | 13 | 29 | −3.7 | −1.5 |
| 174 | 0.1 | 615 | 1.4 | 4 | 13 | 28 | −3.6 | −1.5 |
| 175 | 0.5 | 638 | 1.4 | 4 | 13 | 27 | −3.5 | −1.4 |
| 176 | 1.0 | 665 | 1.5 | 4 | 14 | 27 | −3.6 | −1.3 |
| 177 | 2.0 | 563 | 1.5 | 4 | 13 | 27 | −3.6 | −1.4 |
| *178 | 3.0 | 4 | 2.1 | 24 | 3 | 260 | −10.8 | −8.6 |

Those marked by the symbol * in the tables are listed for comparison and not included in the range of claims in the present invention.

TABLE 20

Sr$_{0.8}$Ba$_{0.2}$TiO$_3$ (A/B = 0.97)
MnO$_2$: 1.0 mol %, SiO$_2$: 1.0 mol %

| Sample Number | Dy$_2$O$_3$ (mol %) | C (nF) | tan δ (%) | V$_{0.1\,mA}$ (V) | α | ESR (m Ω) | ΔC/C (%) | ΔV/V (%/°C.) |
|---|---|---|---|---|---|---|---|---|
| *179 | 0.02 | 0.3 | 2.0 | 450 | 1 | 2.0k | −8.9 | −7.5 |
| 180 | 0.05 | 602 | 1.4 | 4 | 12 | 30 | −3.5 | −1.6 |
| 181 | 0.1 | 617 | 1.5 | 4 | 13 | 29 | −3.7 | −1.5 |
| 182 | 0.5 | 646 | 1.4 | 4 | 14 | 27 | −3.7 | −1.4 |
| 183 | 1.0 | 663 | 1.4 | 4 | 15 | 27 | −3.7 | −1.4 |
| 184 | 2.0 | 563 | 1.5 | 4 | 12 | 30 | −3.5 | −1.5 |
| *185 | 3.0 | 4 | 2.1 | 25 | 3 | 265 | −11.0 | −8.6 |

Those marked by the symbol * in the tables are listed for comparison and not included in the range of claims in the present invention.

TABLE 21

$Sr_{0.8}Ba_{0.2}TiO_3$ (A/B = 0.97)
$MnO_2$; 1.0 mol %, $SiO_2$; 1.0 mol %

| Sample Number | $Nd_2O_3$ (mol %) | C (nF) | tan δ (%) | $V_{0.1 mA}$ (V) | α | ESR (m Ω) | ΔC/C (%) | ΔV/V (%/°C.) |
|---|---|---|---|---|---|---|---|---|
| *186 | 0.02 | 0.3 | 2.0 | 450 | 1 | 2.0k | −8.5 | −7.5 |
| 187 | 0.05 | 609 | 1.4 | 4 | 12 | 28 | −3.9 | −1.5 |
| 188 | 0.1 | 624 | 1.5 | 4 | 13 | 28 | −3.6 | −1.4 |
| 189 | 0.5 | 651 | 1.3 | 4 | 14 | 25 | −3.6 | −1.4 |
| 190 | 1.0 | 677 | 1.4 | 4 | 16 | 26 | −3.6 | −1.3 |
| 191 | 2.0 | 561 | 1.5 | 4 | 12 | 29 | −3.8 | −1.3 |
| *192 | 3.0 | 4 | 2.0 | 25 | 3 | 262 | −11.1 | −6.7 |

Those marked by the symbol * in the tables are listed for comparison and not included in the range of claims in the present invention.

TABLE 22

$Sr_{0.8}Ba_{0.2}TiO_3$ (A/B = 0.99)
$MnO_2$; 1.0 mol %, $SiO_2$; 1.0 mol %

| Sample Number | $Y_2O_3$ (mol %) | C (nF) | tan δ (%) | $V_{0.1 mA}$ (V) | α | ESR (m Ω) | ΔC/C (%) | ΔV/V (%/°C.) |
|---|---|---|---|---|---|---|---|---|
| *193 | 0.02 | 0.3 | 2.5 | 450 | 1 | 2.0k | −8.6 | −8.5 |
| 194 | 0.05 | 575 | 1.5 | 5 | 11 | 33 | −4.0 | −1.5 |
| 195 | 0.1 | 590 | 1.6 | 4 | 12 | 31 | −3.9 | −1.4 |
| 196 | 0.5 | 614 | 1.3 | 4 | 13 | 26 | −3.6 | −1.3 |
| 197 | 1.0 | 621 | 1.5 | 4 | 14 | 27 | −3.6 | −1.4 |
| 198 | 2.0 | 561 | 1.5 | 5 | 10 | 35 | −3.5 | −1.4 |
| *199 | 3.0 | 4 | 2.2 | 26 | 3 | 265 | −11.1 | −7.9 |

Those marked by the symbol * in the tables are listed for comparison and not included in the range of claims in the present invention.

TABLE 23

$Sr_{0.8}Ba_{0.2}TiO_3$ (A/B = 0.97)
$MnO_2$; 1.0 mol %, $SiO_2$; 1.0 mol %

| Sample Number | $La_2O_3$ (mol %) | C (nF) | tan δ (%) | $V_{0.1 mA}$ (V) | α | ESR (m Ω) | ΔC/C (%) | ΔV/V (%/°C.) |
|---|---|---|---|---|---|---|---|---|
| *200 | 0.02 | 0.3 | 2.0 | 450 | 1 | 2.0k | −9.81 | −7.2 |
| 201 | 0.05 | 581 | 1.4 | 5 | 12 | 30 | −3.8 | −1.5 |
| 202 | 0.1 | 593 | 1.5 | 4 | 12 | 29 | −3.7 | −1.4 |
| 203 | 0.5 | 617 | 1.3 | 4 | 13 | 26 | −3.5 | −1.4 |
| 204 | 1.0 | 622 | 1.5 | 4 | 14 | 27 | −3.5 | −1.3 |
| 205 | 2.0 | 563 | 1.6 | 5 | 10 | 31 | −4.0 | −1.4 |
| *206 | 3.0 | 4 | 2.1 | 24 | 3 | 255 | −11.1 | −6.7 |

Those marked by the symbol * in the tables are listed for comparison and not included in the range of claims in the present invention.

TABLE 24

$Sr_{0.8}Ba_{0.2}TiO_3$ (A/B = 0.97)
$MnO_2$; 1.0 mol %, $SiO_2$; 1.0 mol %

| Sample Number | $CeO_2$ (mol %) | C (nF) | tan δ (%) | $V_{0.1 mA}$ (V) | α | ESR (m Ω) | ΔC/C (%) | ΔV/V (%/°C.) |
|---|---|---|---|---|---|---|---|---|
| *207 | 0.02 | 0.3 | 2.0 | 450 | 1 | 2.0k | −10.1 | −8.5 |
| 208 | 0.05 | 580 | 1.4 | 5 | 12 | 29 | −3.7 | −1.4 |
| 209 | 0.1 | 592 | 1.4 | 4 | 12 | 28 | −3.6 | −1.4 |
| 210 | 0.5 | 615 | 1.4 | 4 | 13 | 26 | −3.5 | −1.4 |
| 211 | 1.0 | 621 | 1.5 | 4 | 14 | 27 | −3.5 | −1.3 |
| 212 | 2.0 | 561 | 1.5 | 5 | 10 | 30 | −3.5 | −1.3 |
| *213 | 3.0 | 4 | 2.2 | 25 | 3 | 260 | −11.1 | −8.4 |

Those marked by the symbol * in the tables are listed for comparison and not included in the range of claims in the present invention.

TABLE 25

$Sr_{0.8}Ba_{0.2}TiO_3$ (A/B = 0.97)
$MnO_2$; 1.0 mol %, $SiO_2$; 1.0 mol %

| Sample Number | First Components (mol %) | | C (nF) | tan δ (%) | $V_{0.1 mA}$ (V) | α | ESR (m Ω) | ΔC/C (%) | ΔV/V (%/°C.) |
|---|---|---|---|---|---|---|---|---|---|
| 214 | $Nb_2O_5$ 0.5 | $Ta_2O_5$ 0.5 | 716 | 1.1 | 4 | 18 | 23 | −3.5 | −1.2 |
| 215 | $Nb_2O_5$ 0.5 | $V_2O_5$ 0.5 | 683 | 1.2 | 4 | 16 | 25 | −3.4 | −1.2 |
| 216 | $Nb_2O_5$ 0.5 | $W_2O_5$ 0.5 | 681 | 1.3 | 4 | 15 | 25 | −3.5 | −1.3 |
| 217 | $Nb_2O_5$ 0.5 | $Dy_2O_3$ 0.5 | 655 | 1.3 | 4 | 14 | 28 | −3.5 | −1.3 |

TABLE 25-continued $Sr_{0.8}Ba_{0.2}TiO_3$ (A/B = 0.97)
$MnO_2$; 1.0 mol %, $SiO_2$; 1.0 mol %

| Sample Number | First Components (mol %) | C (nF) | tan δ (%) | $V_{0.1\ mA}$ (V) | α | ESR (m Ω) | ΔC/C (%) | ΔV/V (%/°C.) |
|---|---|---|---|---|---|---|---|---|
| 218 | $Nb_2O_5$ 0.5<br>$Nd_2O_3$ 0.5 | 646 | 1.4 | 4 | 13 | 28 | −3.6 | −1.3 |
| 219 | $Nb_2O_5$ 0.5<br>$Y_2O_3$ 0.5 | 530 | 1.7 | 6 | 10 | 33 | −3.5 | −1.4 |
| 220 | $Nb_2O_5$ 0.5<br>$La_2O_3$ 0.5 | 541 | 1.6 | 6 | 10 | 33 | −3.6 | −1.4 |
| 221 | $Nb_2O_5$ 0.5<br>$CeO_2$ 0.5 | 536 | 1.7 | 6 | 10 | 33 | −3.5 | −1.4 |

As is apparent from the results described in Tables 17–25, the amounts of the first components added are controlled because, when the relative molar contents of the first components are less than 0.05%, the effects of the additives are not enough to make the material semiconductive. When combined relative molar contents of the first components exceed 2.0%, the material is depressed so as to be semiconductive, thereby preventing the capacitor from having predetermined electric characteristics and decreasing sintering density.

The addition of $Nb_2O_5$ or $Ta_2O_5$ as first component seemed to result in better electric characteristics of the capacitor than the cases when $V_2O_5$, $W_2O_5$, $Dy_2O_5$, $Nd_2O_3$, $Y_2O_3$, $La_2O_3$ or $CeO_2$ was added.

The effects of mixed composition of first components to the electric characteristics of the capacitor were studied in several cases. The addition of two kinds or more of the first component to the ceramic material displayed slight appreciable effect to the electric characteristics of the capacitor compared to the cases when one component was added to the material, as shown in Table 25. The addition of $Nb_2O_5$ and $Ta_2O_5$, however, seemed to be more effective in manufacturing a capacitor of better electric characteristics than the addition of other components. As the sample No. 214 shows, simultaneous addition of $Nb_2O_5$ and $Ta_2O_5$ resulted in better electric characteristics.

When mean particle size of the starting material was larger more than 0.5 μm, the addition of first components tended to be not effective, therefore it was confirmed that mean particle size of the starting material should be 0.5 μm or less.

EXAMPLE 4

In the aforementioned examples $Sr_{0.8}Ba_{0.2}TiO_3$ was used as $Sr_{(1-x)}Ba_xTiO_3$ (where $0 < x \leq 0.3$). A laminated ceramic capacitor with varistor function was manufactured by a using similar method described in Examples 1 to 3, except the number of x was changed. A/B ratio was fixed to 0.97 while relative molar contents of first components, 0.5% for $Nb_2O_5$ and $Ta_2O_5$, respectively, and those of second components, 1.0% for $MnO_2$ and $SiO_2$, respectively, were also fixed, the total amount of which was fixed to 2.0%. The results are listed in Table 26.

TABLE 26

$Sr_{(1-x)}Ba_xTiO_3$ (A/B = 0.97)
$Mb_2O_5$; 0.5 mol %, $Ta_2O_5$; 0.5 mol %
$MnO_2$; 1.0 mol %, $SiO_2$; 1.0 mol %

| Sample Number | $Sr_{(1-x)}Ba_xTiO$ (mol %) | C (nF) | tan δ (%) | $V_{0.1\ mA}$ (V) | α | ESR (m Ω) | ΔC/C (%) | ΔV/V (%/°C.) |
|---|---|---|---|---|---|---|---|---|
| 222 | $Sr_{0.99}Ba_{0.01}TiO_3$ | 421 | 1.0 | 4 | 18 | 23 | −3.5 | −1.2 |
| 223 | $Sr_{0.95}Ba_{0.05}TiO_3$ | 501 | 1.0 | 4 | 18 | 23 | −3.7 | −1.2 |
| 224 | $Sr_{0.90}Ba_{0.10}TiO_3$ | 595 | 1.1 | 4 | 18 | 23 | −3.6 | −1.2 |
| 225 | $Sr_{0.80}Ba_{0.20}TiO_3$ | 716 | 1.1 | 4 | 18 | 23 | −3.5 | −1.2 |
| 226 | $Sr_{0.70}Ba_{0.30}TiO_3$ | 817 | 1.5 | 4 | 18 | 23 | −5.5 | −1.8 |
| *227 | $Sr_{0.60}Ba_{0.40}TiO_3$ | 880 | 2.0 | 3 | 17 | 22 | −10.9 | −9.3 |

Those marked by the symbol * in the tables are listed for comparison and not included in the range of claims in the present invention.

As is apparent from the results described in Table 26, the reason the range of x was defined is that Curie point of $Sr_{(1-x)}Ba_xTiO_3$ appears when x exceeds 0.3 and capacitance-temperature rate of change and varistor voltage temperature rate of change becomes larger and the capacitor characteristics and varistor characteristics become unstable, the temperature thereby decreases reliability and performance. In addition, as x exceeds 0.3 and the ratio of Ba increases, the structure of the semiconductor ceramic capacitor thus obtained will change from the grain boundary-insulated structure to the surface re-oxidation structure.

EXAMPLE 5

In the aforementioned examples Pd was used as a material of the inner electrode. A laminated ceramic capacitor with varistor function was manufactured by using a similar method to that described in Examples 1 to 4, except that Au, Pt, Rh or Ni was used as a material of the inner electrode. The ratio of A/B of $Sr_{0.8}Ba_{0.2}TiO_3$ was fixed to 0.97, while relative molar contents of first components, 0.5% for $Nb_2O_5$ and $Ta_2O_5$, respectively, and those of second components, 1.0% for $MnO_2$ and $SiO_2$, respectively, were also fixed. The results are listed in Table 27.

TABLE 27

| | $Sr_{0.8}Ba_{0.2}TiO_3$ (A/B = 0.97) $Nb_2O_5$; 0.5 mol %, $Ta_2O_5$; 0.5 mol % $MnO_2$; 1.0 mol %, $SiO_2$; 1.0 mol % | | | | | | | |
|---|---|---|---|---|---|---|---|---|
| Sample Number | Inner Electrode | C (nF) | tan δ (%) | $V_{0.1\,mA}$ (V) | α | ESR (mΩ) | ΔC/C (%) | ΔV/V (%/°C.) |
| 228 | Pd | 716 | 1.1 | 4 | 18 | 23 | −3.5 | −1.2 |
| 229 | Ni | 766 | 1.9 | 4 | 18 | 30 | −3.6 | −1.6 |
| 230 | Pd—Ni | 734 | 1.7 | 4 | 14 | 24 | −3.5 | −1.3 |
| 231 | Au | 527 | 1.8 | 7 | 10 | 34 | −3.9 | −1.5 |
| 232 | Pt | 541 | 1.8 | 6 | 10 | 34 | −3.8 | −1.7 |
| 237 | Rh | 540 | 1.8 | 6 | 10 | 33 | −3.9 | −1.8 |
| 234 | Pt—Rh | 524 | 1.8 | 7 | 10 | 35 | −3.9 | −1.9 |

As described in Table 27, it was confirmed that at least one or more kinds of metals of Au, Pt, Rh, Pd and Ni, or alloys or compositions thereof, could be used for the material of the inner electrode, each of them having an identical effect as electrode material. When Ni is used for inner electrode material, compositions of Pd to Ni or the use of $Sr_{(1-x)}Ba_xTiO_3$ with slight excess in Ti is recommended since Ni is prone to be oxidized at relatively low temperature.

It was also confirmed that compositions of metals other than those described in the examples of the present invention could be used advantageously for the material of the inner electrode.

In the examples of the present invention, powders of $TiO_2$ are added to the powder material of $Sr_{(1-x)}Ba_xTiO_3$ to prepare $Sr_{(1-x)}Ba_xTiO_3$ with excess Ti. Needless to say, however, carbonate, hydroxide of Ti or organic Ti compounds are also used advantageously for the preparation of the same starting material.

In the examples of the present invention, $Sr_{(1-x)}Ba_xTiO_3$ was used as powder material. Needless to say, however, powder material of $Sr_{(1-x)}Ba_xTiO_3$ prepared from the materials of SrO or $SrCO_3$ and BaO or $BaCO_3$ and $TiO_2$ is used successfully for manufacturing the capacitor elements of identical characteristics.

As for $MnO_2$ and $SiO_2$ as a second component, carbonates or hydroxides of them are also effective for the preparation of the starting material. With respect to Mn, however, use of $MnCO_3$ was confirmed to be more appropriate for manufacturing a capacitor element with stable characteristic and good mass productivity, because the particle size distribution of the compound is fine and uniform, and the compound is readily pyrolyzed.

In the aforementioned examples, the sintering process was performed in a reducing atmosphere of the composition of $N_2:H_2=99:1$. When $H_2$ concentration in the atmosphere is increased, the following phenomena are observed with regard to both the material of the inner electrode and the material of the ceramic capacitor with varistor function;

(1) Electrode material is expanded by occluding $H_2$ gas.

(2) The material of the ceramic capacitor with varistor function is facilitated to be semiconductive.

These phenomena entail the problems in laminated ceramic capacitor with varistor function with respect to electric and mechanical characteristics, comprising; breaking of electrical connections in the inner electrodes, de-lamination of the ceramic sheet, occurrence of cracking in ceramic sheets and incomplete re-oxidation of ceramic materials. Consequently, when sintering is performed in an atmosphere in which $H_2$ concentration is increased, it is preferable for manufacturing a ceramic capacitor with desirable characteristics that sintering temperature range is made a little lower 1200°–1300° C.). On the contrary, ceramic capacitor with varistor function is rather difficult to be semiconductive when it is sintered in $N_2$ atmosphere or in an atmosphere containing a smaller amount of $H_2$ gas. Therefore, the material is preferably sintered in a little higher temperature range (1300° C.–1450° C.). $H_2$ concentration relative to $N_2$ is most preferably in the range of $99.5:0.5 \leqq N_2:H_2 \leqq 95.0: 5.0$.

In the above-mentioned examples, mixed powder was calcinated in the air. Calcination process performed in $N_2$ atmosphere was confirmed, however, to be advantageous also.

With regard to the re-oxidation process, the material was re-oxidized at a predetermined temperature of 1100° C. in the above examples. The temperature range of 900°–1250° C. is also advantageous for re-oxidation to manufacture a capacitor element with desirable characteristics. When re-oxidation is performed at the highest temperature of 1200° C. or more, the duration of high temperature should be as short as possible. Otherwise, not only the materials in grain boundaries but also crystal grains are oxidized and made insulating. When Ni is used for the inner electrode material, prolonged heating at 1200° C. or more for re-oxidation will oxidize metallic Ni itself. Therefore, duration of heating time at higher temperature for re-oxidation should be carefully kept a short as possible.

Ag was used for the material of the outer electrode in the examples described above. However, Pd, Ni, Cu and Zn were confirmed to be used advantageously for the same purpose. The material for the outer electrode comprises at least one or more kinds of Pd, Ag, Ni, Cu and Zn, and alloys or compositions of them. When Pd or Ag is used for the material of outer electrode, an appreciable polarization is observed in the varistor voltage because the metals are rather difficult to make ohmic contact with the capacitor element. However, the basic characteristics of the capacitor is not influenced at all by polarization.

Mean particle size of the powder material of laminated ceramic capacitor with varistor function manufactured by the method disclosed in the above examples was approximately in the range of 2.0–3.0 μm. When calcination is achieved by heating at 1300° C. or higher in the air, sintering of liquid phase of Mn, Si and Ti ternary oxide system is accelerated and consequently growth of grains is enhanced, thereby increasing mean grain size up to twice or more. Increased mean grain size entails many problems comprising; decreasing in sintering density and packing density, decreasing in voltage non-linearity coefficient α, decreasing in equivalent series resistance (ESR) and dispersing in electric characteristics. The ceramic capacitor thus manufactured would be poor in electric characteristics and reliability, thereby making the capacitor inappropriate to practical uses.

fixed to 0.97; the relative molar content of first components was fixed to 0.5% for $Nb_2O_5$ and $Ta_2O_5$, respectively, while those of combined second components was fixed to 1.0% for $MnO_2$ and $SiO_2$, respectively. The results are listed in Table 28.

TABLE 28

| | $Sr_{0.8}Ba_{0.2}TiO_3$ (A/B = 0.97) | | | | | | |
| | $Nb_2O_5$; 0.5 mol %, $Ta_2O_5$; 0.5 mol % | | | | | | |
| | $MnO_2$; 1.0 mol %, $SiO_2$; 1.0 mol % | | | | | | |
| Sample Number | $Na_2SiO_3$ (mol %) | C (nF) | tan δ (%) | $V_{0.1mA}$ (V) | α | ESR (mΩ) | ΔC/C (%) | ΔV/V (%/°C.) |
| --- | --- | --- | --- | --- | --- | --- | --- | --- |
| *235 | 0.02 | 716 | 1.0 | 4 | 18 | 23 | −3.5 | −1.2 |
| 236 | 0.05 | 715 | 1.0 | 4 | 18 | 24 | −2.3 | −0.5 |
| 237 | 0.1 | 714 | 1.0 | 4 | 18 | 24 | −2.4 | −0.5 |
| 238 | 0.5 | 711 | 1.0 | 4 | 18 | 24 | −2.3 | −0.5 |
| 239 | 1.0 | 659 | 1.2 | 4 | 16 | 26 | −2.4 | −0.4 |
| 240 | 2.0 | 621 | 1.5 | 5 | 15 | 30 | −2.4 | −0.5 |
| *241 | 3.0 | 341 | 3.0 | 8 | 8 | 48 | −5.6 | −1.8 |

Those marked by the symbol * in the tables are listed for comparison and not included in the range of claims in the present invention.

The capacitor element thus obtained comprises the advantages of; large capacitance and voltage non-linearity coefficient α, small varistor voltage and equivalent series resistance (ESR), and excellent temperature and frequency characteristics, whereby absorbing low voltage noises and high frequency noises as a function of an ordinary capacitor, absorbing high voltage pulses and electrostatic charges as a function of a varistor, and responding quickly to invading abnormal voltages such as noises, pulses and electrostatic charges. The capacitor is expected to replace various uses of conventional capacitors such as film, laminated ceramic and semiconductor capacitors. Moreover, laminated ceramic capacitors with varistor function of the present invention are smaller in size and larger in capacitance compared to conventional single plate type ceramic capacitor with varistor function, thereby a wide range of applications such as mounting parts in circuit cards is also expected.

In the aforementioned examples, laminated ceramic capacitor with varistor function composed of grain boundary insulated, semiconductor type ceramic was described, said ceramic being composed of $Sr_{(1-x)}Ba_x$-$TiO_3$ in which excess Ti (where $0<x\leq0.3$) is contained so as to adjust the molar ratio of $Sr_{(1-x)}Ba_x$ to Ti in the range of $0.95\leq Sr_{(1-x)}Ba_x/Ti<1.00$, wherein first component such as $Nb_2O_5$ and/or $Ta_2O_5$ are added in relative molar content of 0.05-2.0%, and combined second components of Mn and Si, converting in molecular weight of $MnO_2$ and $SiO_2$ respectively, are added in relative molar content of 0.2-5.0%. According to the present invention, further improvements in characteristics of the capacitor elements made of grain boundary insulated, semiconductor type ceramic are expected, when third and fourth components are added to the ceramic material.

Detailed examples are described hereinafter.

EXAMPLE 6

$Na_2SiO_3$ is added as third component in this example and the effects will be described in further detail with reference to the example.

A laminated ceramic capacitor with varistor function was manufactured by using similar methods as described in Examples 1 to 4, except that the amount of the added third component, $Na_2SiO_3$, was variously adjusted and changed. A/B ratio of $Sr_{0.8}Ba_{0.2}TiO_3$ was As described in Table 28, capacitance-temperature rate of variation and varistor voltage temperature coefficient are improved by adding the third component, $Na_2SiO_3$. $Na_2SiO_3$ works as a carrier to diffuse liquid phase of Mn, Si and Ti ternary oxide system uniformly in the grain boundaries, thereby forming distinct interfaces among the semiconductor crystal region and a high resistance grain boundary region. When the relative molar content of third component added, $Na_2SiO_3$, is less than 0.05%, the effects of the additive is not clear and few improvements in capacitance-temperature rate of variation and varistor voltage temperature coefficient are observed. When relative molar content of third component is over 2.0%, $Na_2SiO_3$ which serves as a carrier will be in excess in grain boundaries, thereby decreasing capacitance and voltage non-linearity coefficient α, increasing equivalent series resistance (ESR), decreasing sintering density and degrading mechanical strength.

A mixture of $Na_2O$ and $SiO_2$ can also be used as a third component instead of $Na_2SiO_3$. Since $Na_2O$ is a very unstable compound and decomposes readily during the sintering process, it is liable to scatter or diffuse into the atmosphere, leaving few Na atoms in the manufactured sintered body. Moreover, it was confirmed that migration of partially ionized $Na^{+1}$ ion under the load of high temperature and high voltage entails degradation of capacitor characteristics. The effects of added Na ion is provided advantageously by adding the ion in the form of a compound with $SiO_2$.

It was confirmed that Na ion should be added to the material in the form of a compound of $Na_2SiO_3$.

EXAMPLE 7

Next, an example where $NaAlO_2$ is added as a third component will be described. A laminated ceramic capacitor with varistor function was manufactured by using similar methods described in Examples 1 to 4, except that the amount of added third component, $NaAlO_2$, was variously adjusted and changed as described in Example 6. A/B ratio of $Sr_{0.8}Ba_{0.2}TiO_3$ was fixed to 0.97; the relative content of first components was fixed to 0.5% for $Nb_2O_5$ and $Ta_2O_5$, respectively, while those of combined second components were fixed to 1.0% for $MnO_2$ and $SiO_2$, respectively. The results are listed in Table 29.

TABLE 29

| | $Sr_{0.8}Ba_{0.2}TiO_3$ (A/B = 0.97) $Nb_2O_5$; 0.5 mol %, $Ta_2O_5$; 0.5 mol % $MnO_2$; 1.0 mol %, $SiO_2$; 1.0 mol % | | | | | | | |
|---|---|---|---|---|---|---|---|---|
| Sample Number | $NaAlO_2$ (mol %) | C (nF) | tan δ (%) | $V_{0.1 mA}$ (V) | α | ESR (m Ω) | ΔC/C (%) | ΔV/V (%/°C.) |
| *242 | 0.02 | 338 | 1.2 | 4 | 17 | 24 | −3.1 | −1.0 |
| 243 | 0.05 | 639 | 1.2 | 4 | 19 | 23 | −2.5 | −0.6 |
| 244 | 0.2 | 640 | 1.2 | 4 | 19 | 23 | −2.5 | −0.6 |
| 245 | 1.0 | 640 | 1.2 | 4 | 19 | 23 | −2.5 | −0.6 |
| 246 | 2.0 | 640 | 1.2 | 4 | 19 | 23 | −2.5 | −0.6 |
| 247 | 4.0 | 636 | 1.7 | 4 | 19 | 23 | −2.6 | −0.6 |
| *248 | 5.0 | 307 | 3.7 | 8 | 8 | 38 | −4.2 | −2.0 |

Those marked by the symbol * in the tables are listed for comparison and not included in the range of claims in the present invention.

As described in Table 29, the first advantage of adding the third component, $NaAlO_2$, to the ceramic material is, just like the addition of $Na_2SiO_3$ described in Example 6, in that it improves the capacitance-temperature rate of change and varistor voltage temperature coefficient. Na atoms in added $NaAlO_3$ work as carriers to diffuse liquid phase of Mn, Si and Ti ternary oxide system homogeneously into grain boundaries, thereby forming distinct interfaces among semiconductive crystal grains and grain boundaries of high electric resistance.

Second, voltage non-linearity coefficient α increases and equivalent series resistance (ESR) decreases by adding $NaAlO_2$, because Al atoms in $NaAlO_2$ are solubilized in a solid state into the crystal lattice, thereby decreasing electric resistance of crystal grains. When relative molar content of added $NaAlO_2$ is less than 0.05%, characteristics of the capacitor are not influenced desirably by the additive; giving no improvements in capacitance-temperature rate of change and varistor temperature coefficient, nor increasing voltage non-linearity coefficient α, and not decreasing equivalent series resistance (ESR). On the other hand, when relative molar content of the additive exceeds 4.0%, which means it exceeds the saturated solubility in the crystal lattice, excess $NaAlO_2$ segregates in the grain boundaries, thereby increasing electric resistance of the grain boundaries and hence decreasing capacitance and voltage non-linearity coefficient rapidly and decreasing mechanical strength of the capacitor.

A mixture of $Na_2O$ and $Al_2O_3$ can also be used as the third component instead of $NaAlO_2$. Since $Na_2O$ is a very unstable compound and decomposes readily during the sintering process, it is liable to scatter or diffuse into the atmosphere, leaving few Na atoms in the manufactured sintered body. Moreover, it was confirmed that migration of partially ionized $Na^{+1}$ ion under the load of high temperature and high voltage entails degradation of capacitor characteristics. The effects of added Na ion is provided advantageously by adding the ion in the form of a compound of $NaAlO_2$.

It was confirmed that Na ion should be added to the material in the form of a compound of $NaAlO_2$.

EXAMPLE 8

An example where $Li_2SiO_3$ is added as a third component will be described. A laminated ceramic capacitor with varistor function was manufactured by using similar methods described in Examples 1 to 4, except that the amount of the added third component, $Li_2SiO_3$, was adjusted and changed variously as is described in Examples 6 and 7. A/B ratio of $Sr_{0.8}Ba_{0.2}TiO_3$ was fixed to 0.97; the relative content of the first components was fixed to 0.5% for $Nb_2O_5$ and $Ta_2O_5$, respectively, while those of combined second components were fixed to 1.0% for $MnO_2$ and $SiO_2$, respectively. The results are listed in Table 30.

TABLE 30

| | $Sr_{0.8}Ba_{0.2}TiO_3$ (A/B = 0.97) $Nb_2O_5$; 0.5 mol %, $Ta_2O_5$; 0.5 mol % $MnO_2$; 1.0 mol %, $SiO_2$; 1.0 mol % | | | | | | | |
|---|---|---|---|---|---|---|---|---|
| Sample Number | $Li_2SiO_3$ (mol %) | C (nF) | tan δ (%) | $V_{0.1 mA}$ (V) | α | ESR (m Ω) | ΔC/C (%) | ΔV/V (%/°C.) |
| *249 | 0.02 | 709 | 1.4 | 4 | 18 | 29 | −3.9 | −2.0 |
| 250 | 0.05 | 703 | 1.4 | 4 | 18 | 30 | −2.6 | −1.2 |
| 251 | 0.1 | 704 | 1.4 | 4 | 18 | 30 | −2.7 | −1.2 |
| 252 | 0.5 | 702 | 1.4 | 4 | 18 | 30 | −2.7 | −1.0 |
| 253 | 1.0 | 650 | 1.6 | 4 | 16 | 32 | −2.7 | −0.9 |
| 254 | 2.0 | 617 | 1.8 | 5 | 15 | 32 | −2.7 | −1.2 |
| *255 | 3.0 | 337 | 3.4 | 8 | 8 | 52 | −6.9 | −2.4 |

Those marked by the symbol * in the tables are listed for comparison and not included in the range of claims in the present invention.

As described in Table 30, by adding the third component, $Li_2SiO_3$, just like Examples 6 and 7, capacitance-temperature rate of change and varistor voltage temperature coefficient are improved. Added $Li_2SiO_3$ works as carriers to diffuse the liquid phase of Mn, Si and Ti ternary oxide system homogeneously into grain boundaries, thereby forming distinct interfaces among semiconductive crystal grains and grain boundaries of high electric resistance. When relative molar content of added $Li_2SiO_3$ is less than 0.05%, characteristics of the capacitor are not influenced desirably by the additive, giving no improvements in capacitance-temperature rate of change and varistor temperature coefficient. On the other hand, when relative molar content of the additive exceeds 2.0%, the amount of carrier $Li_2SiO_3$ increases, thereby decreasing capacitance and voltage non-linearity coefficient α, increasing equivalent series resistance (ESR), and decreasing sintering density and mechanical strength of the capacitor.

A mixture of $Li_2O$ and $SiO_2$ can also be used as a third component instead of $Li_2SiO_3$. Since $Li_2O$ is a very unstable compound and decomposes readily during the sintering process, it is liable to scatter or diffuse into the atmosphere, leaving few Li atoms in the manufactured sintered body. Moreover, it was confirmed that migration of partially ionized $Li^{+1}$ ion under the load of high temperature and high voltage entails degradation of capacitor characteristics. The effects of added Li ion is provided advantageously by adding the ion in the form of a compound of Li and $SiO_2$.

Thus, Li ion should be added to the material in the form of a compound of $Li_2SiO_3$.

EXAMPLE 9

Next, an example where $LiAlO_2$ is added as a third component will be described. A laminated ceramic capacitor with varistor function was manufactured by using similar methods described in Examples 1 to 4, except that the amount of the added third component, $LiAlO_2$, was adjusted and changed variously as described in Examples 6 to 8. A/B ratio of $Sr_{0.8}Ba_{0.2}TiO_3$ was fixed to 0.97; the relative contents of the first components was fixed to 0.5% for $Nb_2O_5$ and $Ta_2O_5$ while those of combined second components were fixed to 1.0% for $MnO_2$ and $SiO_2$, respectively. The results are listed in Table 31.

thereby decreasing electric resistance of the crystal grains.

When relative molar content of added $NaAlO_2$ as a third component is less than 0.05%, characteristics of the capacitor are not influenced desirably by the additive; giving no improvements in capacitance-temperature rate of change and varistor temperature coefficient, nor increasing voltage non-linearity coefficient α, and not decreasing equivalent series resistance (ESR).

On the other hand, when the relative molar content of the additive exceeds 4.0%, which means it exceeds the saturated solubility in the crystal lattice, excess $LiAlO_2$ segregates in the grain boundaries, thereby decreasing electric resistance of grain boundaries and hence decreasing capacitance and voltage non-linearity coefficient α rapidly, increasing equivalent series resistance (ESR) and decreasing sintering density and mechanical strength of the capacitor.

A mixture of $Li_2O$ and $AlO_2$ can also be used as a third component instead of $LiAlO_2$.

However, when a mixture of $Li_2O$ and $AlO_3$ is used, since $Li_2O$ is a very unstable compound and decomposes readily during sintering process, it is liable to scatter or diffuse into the atmosphere, leaving few Li atoms in the manufactured sintered body. Moreover, it was confirmed that migration of partially ionized $Li^{+1}$ ion under the load of high temperature and high voltage entails degradation of capacitor characteristics. The effects of added Li ion is provided advantageously by adding the ion in the form of a compound of $LiAlO_2$.

TABLE 31

| | $Sr_{0.8}Ba_{0.2}TiO_3$ (A/B = 0.97) | | | | | | | |
| | $Nb_2O_5$: 0.5 mol %, $Ta_2O_5$: 0.5 mol % | | | | | | | |
| | $MnO_2$: 1.0 mol %, $SiO_2$: 1.0 mol % | | | | | | | |
| Sample Number | $LiAlO_2$ (mol %) | C (nF) | tan δ (%) | $V_{0.1 mA}$ (V) | α | ESR (m Ω) | ΔC/C (%) | ΔV/V (%/°C.) |
|---|---|---|---|---|---|---|---|---|
| *256 | 0.02 | 621 | 1.4 | 4 | 17 | 27 | −3.2 | −1.2 |
| 257 | 0.05 | 620 | 1.4 | 4 | 19 | 25 | −2.7 | −1.0 |
| 258 | 0.2 | 623 | 1.4 | 4 | 19 | 25 | −2.7 | −1.0 |
| 259 | 1.0 | 623 | 1.4 | 4 | 19 | 25 | −2.7 | −1.0 |
| 260 | 2.0 | 620 | 1.4 | 4 | 19 | 25 | −2.7 | −1.1 |
| 261 | 4.0 | 619 | 1.9 | 4 | 19 | 25 | −2.8 | −1.1 |
| *262 | 5.0 | 295 | 4.1 | 8 | 8 | 42 | −4.6 | −2.9 |

Those marked by the symbol * in the tables are listed for comparison and not included in the range of claims in the present invention.

As described in Table 31, the first advantage of adding the third component, $LiAlO_2$, to the ceramic material is, just like the addition of third component described in Examples 6 to 8, it improves the capacitance-temperature rate of change and varistor voltage temperature coefficient. Al atoms in added $LiAlO_2$ work as carriers to diffuse liquid phase of Mn, Si and Ti ternary oxide system homogeneously into grain boundaries, thereby forming distinct interfaces among semi-conductive crystal grains and grain boundaries of high electric resistance.

Second, voltage non-linearity coefficient α increases and equivalent series resistance (ESR) decreases by adding $LiAlO_2$, because Al atoms in added $LiAlO_2$ are solubilized in a solid state into the crystal lattice, It was confirmed that Li ion should be added to the material in the form of a compound of $LiAlO_2$.

EXAMPLE 10

$Na_2SiO_3$ and $Al_2O_3$ are added as third and fourth components, respectively in this example. A laminated ceramic capacitor with varistor function was manufactured by using similar methods described in Examples 1 to 4, except that the amount of the added fourth component, $Al_2O_3$, was variously adjusted and changed. A/B ratio of $Sr_{0.8}Ba_{0.2}TiO_3$ was fixed to 0.97; the relative molar contents of first components were fixed to 0.5% for $Nb_2O_5$ and $Ta_2O_5$, respectively, while those of combined second components were fixed to 1.0% for $MnO_2$ and $SiO_2$, respectively. Relative molar content of third material, $Na2SiO_3$, was also fixed to 0.5%. The results ar listed in Table 32.

TABLE 32

Sr$_{0.8}$Ba$_{0.2}$TiO$_3$ (A/B = 0.97)
Nb$_2$O$_5$; 0.5 mol %, Ta$_2$O$_5$; 0.5 mol %
MnO$_2$; 1.0 mol %, SiO$_2$; 1.0 mol %, Na$_2$SiO$_3$; 0.5 mol %

| Sample Number | Al$_2$O$_3$ (mol %) | C (nF) | tan δ (%) | V$_{0.1\,mA}$ (V) | α | ESR (m Ω) | ΔC/C (%) | ΔV/V (%/°C.) |
|---|---|---|---|---|---|---|---|---|
| *263 | 0.02 | 711 | 1.0 | 4 | 18 | 24 | −2.8 | −0.8 |
| 264  | 0.05 | 710 | 1.0 | 4 | 20 | 22 | −2.3 | −0.5 |
| 265  | 0.1  | 709 | 1.0 | 4 | 20 | 22 | −2.3 | −0.5 |
| 266  | 0.5  | 711 | 1.0 | 4 | 20 | 22 | −2.3 | −0.5 |
| 267  | 1.0  | 711 | 1.0 | 4 | 20 | 22 | −2.3 | −0.5 |
| 268  | 2.0  | 707 | 1.5 | 4 | 20 | 22 | −2.4 | −0.5 |
| *269 | 3.0  | 341 | 3.5 | 8 | 9  | 38 | −3.8 | −1.8 |

Those marked by the symbol * in the tables are listed for comparison and not included in the range of claims in the present invention.

As described in Table 32, the addition of the fourth component, Al$_2$O$_3$, increases voltage non-linearity coefficient α and decreases equivalent series resistance (ESR), because Al$_2$O$_3$ added is solubilized in a solid state into the crystal lattice and decreases electric resistance of the crystal grains. When relative molar content of the fourth component added, Al$_2$O$_3$, is less than 0.05%, characteristics of the capacitor are not influenced desirably by the additive; giving no improvements in voltage non-linearity coefficient α and not decreasing equivalent series resistance (ESR). On the other hand, when the relative molar content of the additive exceeds 2.0%, which means it exceeds the saturated solubility in the crystal lattice, excess Al$_2$O$_3$ segregates in the grain boundaries, thereby decreasing electric resistance of grain boundaries and hence decreasing capacitance and voltage non-linearity coefficient α rapidly.

EXAMPLE 11

Li$_2$SiO$_3$ and Al$_2$O$_3$ are added as third and fourth components, respectively, in this example. A laminated ceramic capacitor with varistor function was manufactured by using similar methods described in Examples 1 to 4, except that the amount of added fourth component, Al$_2$O$_3$, was adjusted and changed variously. A/B ratio of Sr$_{0.8}$Ba$_{0.2}$TiO$_3$ was fixed to 0.97; the relative molar contents of the first components was fixed to 0.5% for Nb$_2$O$_5$ and Ta$_2$O$_5$, respectively, while those of combined second components were fixed to 1.0% for MnO$_2$ and SiO$_2$, respectively. Relative molar content of third material, Li$_2$SiO$_3$, was also fixed to 0.5%. The results are listed in Table 33.

TABLE 27

Sr$_{0.8}$Ba$_{0.2}$TiO$_3$ (A/B = 0.97)
Nb$_2$O$_5$; 0.5 mol %, Ta$_2$O$_5$; 0.5 mol %
MnO$_2$; 1.0 mol %, SiO$_2$; 1.0 mol %, Li$_2$SiO$_3$; 0.5 mol %

| Sample Number | Al$_2$O$_3$ (mol %) | C (nF) | tan δ (%) | V$_{0.1\,mA}$ (V) | α | ESR (m Ω) | ΔC/C (%) | ΔV/V (%/°C.) |
|---|---|---|---|---|---|---|---|---|
| *270 | 0.02 | 700 | 1.2 | 4 | 18 | 27 | −3.0 | −1.0 |
| 271  | 0.05 | 699 | 1.2 | 4 | 20 | 23 | −2.4 | −0.7 |
| 272  | 0.1  | 697 | 1.2 | 4 | 20 | 22 | −2.4 | −0.7 |
| 273  | 0.5  | 701 | 1.3 | 4 | 20 | 22 | −2.4 | −0.6 |
| 274  | 1.0  | 700 | 1.3 | 4 | 20 | 22 | −2.4 | −0.7 |
| 275  | 2.0  | 697 | 1.8 | 4 | 19 | 24 | −2.6 | −0.7 |
| *276 | 3.0  | 332 | 3.8 | 8 | 8  | 33 | −3.0 | −2.0 |

Those marked by the symbol * in the tables are listed for comparison and not included in the range of claims in the present invention.

As described in Table 33, addition of the fourth component, Al$_2$O$_3$, increases voltage non-linearity coefficient α and decreases equivalent series resistance (ESR), because Al$_2$O$_3$ added is solubilized in solid state into the crystal lattice and decreases electric resistance of crystal grains. When relative molar content of fourth component added, Al$_2$O$_3$, is less than 0.05%, characteristics of the capacitor are not influenced desirably by the additive; giving no improvements in voltage non-linearity coefficient α and not decreasing equivalent series resistance (ESR). On the other hand, when relative molar content of the additive exceeds 2.0%, which means the saturated solubility in the crystal lattice, excess Al$_2$O$_3$ segregate in the grain boundaries, thereby decreasing electric resistance of grain boundaries and hence decreasing capacitance and voltage non-linearity coefficient α rapidly.

Effects of adding one of the third components, Na$_2$SiO$_3$, NaAlO$_2$, Li$_2$SiO$_3$ and LiAlO$_2$ to the ceramic material were described in Examples 6 to 9. In Examples 11 and 12, two combinations of the additives, Na$_2$SiO$_3$ as a third component and Al$_2$O$_3$ as a fourth component; and Li$_2$SiO$_3$ as a third component and Al$_2$O$_3$ as a fourth component were described. However, other combinations can be used with respect to the present invention.

One of them is to use only Al$_2$O$_3$ as a third component. In this case, as described in Examples 10 and 11, by adding a relative molar content of 0.05 to 2.0% of the third component, Al$_2$O$_3$, voltage non-linearity coefficient α is improved and equivalent series resistance (ESR) is decreased. In addition, various combinations of third and fourth components other than those described in Examples 11 and 12, for example combination of Na$_2$SiO$_3$ and Li$_2$SiO$_3$ or NaAlO$_2$ and LiAlO$_2$, were also devised. Improvements in characteristics of the capacitors by adding Na$_2$SiO$_3$, Li$_2$SiO$_3$ and Al$_2$O$_3$ as third, fourth and fifth components are considered to be possible. In summary, any combinations of the aforementioned compounds are possible as third, fourth, and fifth components, and so on so as to obtain a capacitor of the desired characteristics.

The material of the inner and outer electrodes described in Examples 1 to 5 are also applied to the electrodes for the capacitors described in Examples 6 to 10.

INDUSTRIAL APPLICABILITY

As described above, according to the present invention, a laminated ceramic capacitor with varistor function is obtained comprising both functions of a capacitor and a varistor, and the capacitor is capable of mounting on the circuit board. The capacitor works as an ordinary capacitor which absorbs low voltage noises and high frequency noises while it functions as a varistor when high voltage pulses and electrostatic charges invade, thereby protecting semiconductors and electronic instruments from abnormal voltages such as noises, pulses and electrostatic charges generated by surrounding electronic instruments. The characteristics of the capacitor are always stable to temperature changes. Practical applications of the above capacitor are;

(1) The capacitor can replace conventional film, laminated ceramic and semiconductor type capacitors which are used for by-pass capacitors for protecting IC and LSI mounted on the circuit cards of electronic equipment.

(2) The capacitor can replace ZnO type capacitors which are used for preventing malfunctioning of electronic equipment and absorbing ON-OFF surge arising from inductive loads. The capacitor possesses both functions described in above-discussed terms of (1) and (2) and wide range of applications ar to be expected.

Manufacturing of a laminated ceramic capacitor with varistor function of the present invention is made easy because simultaneous sintering of the materials of ceramic capacitor with varistor function with the materials of inner electrode has became possible for the following reasons. Besides materials to be semiconductive are added to $Sr_{(1-x)}Ba_xTiO_3$ with excess Ti, Mn-Si components composed of $MnO_2$ and $SiO_2$ is also added in the sintering process. Grain boundary insulated structure of semiconductor type ceramic capacitor is formed readily by a re-oxidation process by using the material of the above-described composition, whereas surface diffusion process of metal oxides is necessary in the manufacturing process of conventional ceramic capacitor. Many troubles of breaking the electrical connection in inner electrodes, de-lamination, cracks in ceramic sheets, decrease in sintering density and non-uniformity of the texture in the sintered body in the laminated ceramic capacitor with varistor function manufactured are prevented from occurring by sintering the raw laminated body in the air. Electric characteristics such as capacitance, voltage non-linearity coefficient $\alpha$ and varistor voltage, and reliability of the products are largely improved. The present invention provides two major advantages in the aforementioned composition of the starting materials and in the manufacturing process of the capacitors.

Since the laminated ceramic capacitor with varistor function of the present invention is smaller in size and possesses larger capacitance and higher performances compared to conventional single plate type ceramic capacitor with varistor function, the former capacitor is expected to have a wide range of applications as highly integrated mounting elements for electronic equipment such as video camera and communication apparatus.

Therefore, according to the present invention capacitor elements comprising the functions of protecting semiconductors and electronic equipment from invading abnormal voltages such as noises, pulses and electrostatic charges can be obtained. Characteristics of the capacitor is so stable to temperature changes that effects of the present invention are greatly improved from the point of practical applications.

We claim:

1. A method for manufacturing semiconductor-type laminated ceramic capacitors with a grain boundary-insulated structure comprising the steps of calcinating starting material of mixed powder in air or in nitrogen atmosphere after grinding, mixing and drying said mixed powder; forming raw sheets by dispersing said calcinated powder in a solvent with organic binder and molding said dispersed powder, said calcinated powder being re-ground before dispersing and after calcinating to a mean particle size of 0.5 μm or less; printing a pattern of inner electrode paste of the surface of said raw sheets, terminals of said inner electrodes being extended to each of the corresponding opposite edges of said raw sheets alternatively one by one (wherein patterns of inner electrodes are not printed on uppermost and lowermost parts of raw sheets); calcinating a laminated body in air, said laminated body being formed by laminating and compressing said raw sheets on which surfaces patterns of inner electrode paste have been printed; sintering said laminated raw sheets in reducing atmosphere or in nitrogen atmosphere after calcination; re-oxidizing in air after sintering; and covering said edges of sintered ceramic sheets with outer electrode paste and baking after re-oxidation, terminals of inner electrodes being exposed to said edges, wherein: said starting material of mixed powder comprises a material of the composition $Sr_{(1-x)}Ba_xTiO_3$ containing excess Ti to make a final molecular ratio of Ti to $Sr_{(1-x)}Ba_x$ in the range of $0.95 \leq Sr_{(1-x)}Ba_x/Ti < 1.00$ (where x is in the range of $0 < x \leq 0.3$); at least one or more kinds of the compounds selected from $Nb_2O_5$, $Ta_2O_5$, $V_2O_5$, $W_2O_5$, $Dy_2O_5$, $Nd_2O_3$, $Y_2O_3$, $La_2O_3$, or $CeO_2$ are added to said starting material to make their relative molar content in the range from 0.05 to 2.0%, and Mn and Si are also included in said starting material to the amount of their combined relative molar content, converting into $MnO_2$ and $SiO_2$ respectively, in the range of 0.2 to 5.0%.

2. A method for manufacturing semiconductor-type laminated ceramic capacitors with a grain boundary-insulated structure according to claim 1, wherein said inner electrode is made of at least one or more kinds of metals selected from Au, Pt, Rh, Pd or Ni, or alloys or compositions thereof.

3. A method for manufacturing semiconductor-type laminated ceramic capacitors with a grain boundary-insulated structure according to claim 1, wherein said outer electrode is made of at least one or more kinds of metals selected from Pd, Ag, Ni, Cu or Zn, or alloys or compositions thereof.

4. A method for manufacturing semiconductor-type laminated ceramic capacitors with a grain boundary-insulated structure comprising the steps of calcinating starting material of mixed powder in air or in nitrogen atmosphere after grinding, mixing and drying said mixed powder; forming raw sheets by dispersing said calcinated powder in a solvent with organic binder and molding said dispersed powder, said calcinated powder being re-ground before dispersing and after calcinating to a mean particle size of 0.5 μm or less; printing a pattern of inner electrode paste on the surface of said raw sheets, terminals of said inner electrodes being extended to each of the corresponding opposite edges of said raw sheets alternatively one by one (wherein patterns of inner electrodes are not printed on uppermost and lowermost parts of raw sheets); calcinating laminated body in air, said laminated body being formed by laminating and compressing said raw sheets on which surfaces patterns of inner electrode paste have been printed; sintering said laminated raw sheets in reducing atmosphere or in nitrogen atmosphere after calcination; re-oxidizing in air after sintering; and covering said edges of sintered ceramic sheets with outer electrode paste and baking after re-oxidation, terminals of inner electrodes being exposed to said edges, wherein: said starting material of mixed powder comprises of a material of the composition of $Sr_{(1-x)}Ba_xTiO_3$ containing excess Ti to make final molecular ratio of Ti to $Sr_{(1-x)}Ba_x$ in the range of $0.95 \leq Sr_{(1-x)}Ba_x/Ti < 1.00$ (where x is in the range of $0 < x \leq 0.3$); at least one or more kinds of the compounds selected from $Nb_2O_5$, $Ta_2O_5$, $V_2O_5$, $W_2O_5$, $Dy_2O_3$, $Nd_2O_3$, $Y_2O_3$, $La_2O_3$ or $CeO_2$ are added to said starting material to make their relative molar content in the range from 0.05 to 2.0%; Mn and Si are also included in said starting material to the amount of their combined relative molar content, converting into $MnO_2$ and $SiO_2$ respectively, in the range of 0.2 to 5.0%; and $Na_2SiO_3$ is further included in said ceramic material to make relative molar content in the range of 0.05-2.0%.

5. A method for manufacturing semiconductor-type laminated ceramic capacitors with a grain boundary-insulated structure comprising the steps of calcinating starting material of mixed powder in air or in nitrogen atmosphere after grinding, mixing and drying said mixed powder; forming raw sheets by dispersing said calcinated powder in a solvent with organic binder and molding said dispersed powder, said calcinated powder being re-ground before dispersing and after calcinating to a mean particle size of 0.5 μm or less; printing a pattern of inner electrode paste on the surfaces of said raw sheets, terminals of said inner electrodes being extended to each of the corresponding opposite edges of said raw sheets alternatively one by one (wherein patterns of inner electrodes are not printed on uppermost and lowermost parts of raw sheets); calcinating laminated body in air, said laminated body being formed by laminating and compressing said raw sheets on which surfaces patterns of inner electrode paste has been printed; sintering said laminated raw sheets in reducing atmosphere or in nitrogen atmosphere after calcination; re-oxidizing in air after sintering; and covering said edges of sintered ceramic sheets with outer electrode paste and baking after re-oxidation, terminals of inner electrodes being exposed to said edges, wherein: said starting material of mixed powder comprises of a material of the composition of $Sr_{(1-x)}Ba_xTiO_3$ containing excess Ti to make final molecular ratio of Ti to $Sr_{(1-x)}Ba_x$ in the range of $0.95 \leq Sr_{(1-x)}Ba_x/Ti < 1.00$ (where x is in the range of $0 < x \leq 0.3$); at least one or more kinds of the compounds selected from $Nb_2O_5$, $Ta_2O_5$, $V_2O_5$, $W_2O_5$, $Dy_2O_3$, $Nd_2O_3$, $Y_2O_3$, $La_2O_3$ or $CeO_2$ are added to said starting material to make their relative molar content in the range from 0.05 to 2.0%; Mn and Si are also included in said starting material to the amount of their combined relative molar content, converting into $MnO_2$ and $SiO_2$ respectively, in the range of 0.2 to 5.0%; and $NaAlO_2$ is further included to said ceramic material to make their relative molar content in the range from 0.05 to 4.0%.

6. A method for manufacturing semiconductor-type laminated ceramic capacitors with a grain boundary-insulated structure comprising the steps of calcinating starting material of mixed powder in air or in nitrogen atmosphere after grinding, mixing and drying said mixed powder; forming raw sheets by dispersing said calcinated powder in a solvent with organic binder and molding said dispersed powder, said calcinated powder being re-ground before dispersing and after calcinating to a mean particle size of 0.5 μm or less; printing a pattern of inner electrode paste on the surfaces of said raw sheets, terminals of said inner electrodes being extended to each of the corresponding opposite edges of said raw sheet alternatively one by one (wherein patterns of inner electrodes are not printed on uppermost and lowermost parts of raw sheets); calcinating laminated body in air, said laminated body being formed by laminating and compressing said raw sheets on which surfaces patterns of inner electrode paste have been printed; sintering said laminated raw sheets in reducing atmosphere or in nitrogen atmosphere after calcination; re-oxidizing in air after sintering; and covering said edges of sintered ceramic sheets with outer electrode paste and baking after re-oxidation, terminals of inner electrodes being exposed to said edges, wherein: said starting material of mixed powder comprises of a material of the composition of $Sr_{(1-x)Ba_x}TiO_3$ containing excess Ti to make final molecular ratio of Ti to $Sr_{(1-x)}Ba_x$ in the range of $0.95 \leq Sr_{(1-x)}Ba_x/Ti < 1.00$ (where x is in the range of $0 < x \leq 0.3$); at least one or more kinds of the compounds selected from $Nb_2O_5$, $Ta_2O_5$, $V_2O_5$, $W_2O_5$, $Dy_2O_3$, $Nd_2O_3$, $Y_2O_3$, $La_2O_3$ or $CeO_2$ are added to said starting material to make their relative molar content in the range from 0.05 to 2.0%; Mn and Si are also included in said starting material to the amount of their combined relative molar content, converting into $MnO_2$ and $SiO_2$ respectively, in the range of 0.2 to 5.0%; and $Li_2SiO_3$ is further included to said ceramic material to make their relative molar content in the range from 0.05 to 2.0%.

7. A method for manufacturing semiconductor-type laminated ceramic capacitors with a grain boundary-insulated structure comprising the steps of: calcinating starting material of mixed powder in air or in nitrogen atmosphere after grinding, mixing and drying said mixed powder; forming raw sheets by dispersing said calcinated powder in a solvent with organic binder and molding said dispersed powder, said calcinated powder being re-ground before dispersing and after calcinating to a mean particle size of 0.5 μm or less; printing a pattern of inner electrode paste on the surfaces of said raw sheets, terminals of said inner electrodes being extended to each of the corresponding opposite edges of said raw sheets alternatively one by one (wherein patterns of inner electrodes are not printed on uppermost and lowermost parts of raw sheets); calcinating laminated body in air, said laminated body being formed by laminating and compressing said raw sheets on which surfaces patterns of inner electrode paste has been printed; sintering said laminated raw sheets in reducing atmosphere or in nitrogen atmosphere after calcination; re-oxidizing in air after sintering; and covering said edges of sintered ceramic sheets with outer electrode paste and baking after re-oxidation, terminals of inner electrodes being exposed to said edges, wherein: said starting material of mixed powder comprises of a material of the composition of $Sr_{(1-x)}Ba_xTiO_3$ containing excess Ti to make final molecular ratio of Ti to $Sr_{(1-x)}Ba_x$ in the range of $0.95 \leq Sr_{(1-x)}Ba_x/Ti < 1.00$ (where x is in the range of $0 < x \leq 0.3$); at least one or more kinds of the compounds selected from $Nb_2O_5$, $Ta_2O_5$, $V_2O_5$, $W_2O_5$, $Dy_2O_3$, $Nd_2O_3$, $Y_2O_3$, $La_2O_3$ or $CeO_2$ are added to said starting material to make their relative molar content in the range from 0.05 to 2.0%; Mn and Si are also included in said starting material to the amount of their combined relative molar content, converting into $MnO_2$ and $SiO_2$ respectively, in the range of 0.2 to 5.0%; and $LiAlO_2$ is further included in said ceramic material to make relative molar content in the range of 0.05–4.0%.

8. A method for manufacturing semiconductor-type laminated ceramic capacitors with a grain boundary-insulated structure comprising the steps of: calcinating starting material of mixed powder in air or in nitrogen atmosphere after grinding, mixing and drying said mixed powder; forming raw sheets by dispersing said calcinated powder in a solvent with organic binder and molding said dispersed powder, said calcinated powder being re-ground before dispersing and after calcinating to a mean particle size of 0.5 μm or less; printing a pattern of inner electrode paste on the surfaces of said raw sheets, terminals of said inner electrodes being extended to each of the corresponding opposite edges of said raw sheet alternatively one by one (wherein patterns of inner electrodes are not printed on uppermost and lowermost parts of raw sheets); calcinating laminated body in air, said laminated body being formed by laminating and compressing said raw sheets on which surfaces patterns of inner electrode paste has been printed; sintering said laminated raw sheets in reducing atmosphere or in nitrogen atmosphere after calcination; re-oxidizing in air after sintering; and covering said edges of sintered ceramic sheets with outer electrode paste and baking after re-oxidation, terminals of inner electrodes being exposed to said edges, wherein: said starting material of mixed powder comprises of a material of the composition of $Sr_{(1-x)}Ba_xTiO_3$ containing excess Ti to make final molecular ratio of Ti to $Sr_{(1-x)}Ba_x$ in the range of $0.95 \leq Sr_{(1-x)}Ba_x/Ti < 1.00$ (where x is in the range of $0 > x \leq 0.3$); at least one or more kinds of the compounds selected from $Nb_2O_5$, $Ta_2O_5$, $V_2O_5$, $Dy_2O_3$, $Nd_2O_3$, $Y_2O_3$, $La_2O_3$ or $CeO_2$ are added to said starting material to make their relative molar content in the range from 0.05 to 2.0% Mn and Si are also included in said starting material to the amount of their combined relative molar content, converting into $MnO_2$ and $SiO_2$ respectively, in the range of 0.2 to 5.0% , and $Na_2SiO_3$ and $Al_2O_3$ are further included in said ceramic material to make relative molar content in the range of 0.05-2.0% and 0.05-2.0%, respectively.

9. A method for manufacturing semiconductor-type laminated ceramic capacitors with a grain boundary-insulated structure comprising the steps of: calcinating starting material of mixed powder in air or in nitrogen atmosphere after grinding, mixing and drying said mixed powder; forming raw sheets by dispersing said calcinated powder in a solvent with organic binder and molding said dispersed powder, said calcinated powder being re-ground before dispersing and after calcinating to a mean particle size of 0.5 μm or less; printing a pattern of inner electrode paste on the surfaces of said raw sheets, terminals of said inner electrodes being extended to each of the corresponding opposite edges of said raw sheets alternatively one by one (wherein patterns of inner electrodes are not printed on uppermost and lowermost parts of raw sheets); calcinating laminated body in air, said laminated body being formed by laminating and compressing said raw sheets on which surfaces patterns of inner electrode paste has been printed; sintering said laminated raw sheets in a reducing atmosphere or in a nitrogen atmosphere after calcination; re-oxidizing in air after sintering; and covering said edges of sintered ceramic sheets with outer electrode paste and baking after re-oxidation, terminals of inner electrodes being exposed to said edges, wherein: said starting material of mixed powder comprises of a material of the composition of $Sr_{(1-x)}Ba_xTiO_3$ containing excess Ti to make final molecular ratio of Ti to $Sr_{(1-x)}Ba_x$ in the range of $0.95 \leq Sr_{(1-x)}Ba_x/Ti < 1.00$ (where x is in the range of $0 < x \leq 0.3$); at least one or more kinds of the compounds selected from $Nb_2O_5$, $Ta_2O_5$, $V_2O_5$, $W_2O_5$, $Dy_2O_3$, $Nd_2O$, $Y_2O_3$, $La_2O_3$ or $CeO_2$ are added to said starting material to make their relative molar content in the range from 0.05 to 2.0%; Mn and Si are also included in said starting material to the amount of their combined relative molar content, converting into $MnO_2$ and $SiO_2$ respectively, in the range of 0.2 to 5.0%; and $Li_2SiO_3$ and $Al_2O_3$ are further included in said ceramic material to make their relative molar contents in the range of 0.05-2.0% and 0.05-2.0%, respectively.

10. A method for manufacturing semiconductor-type laminated ceramic capacitors with a grain boundary-insulated structure according to claim 2, wherein said outer electrode is made of at least one or more kinds of metals selected from Pd, Ag, Ni, Cu or Zn, or alloys or compositions thereof.

11. A method for manufacturing semiconductor-type laminated ceramic capacitors with a grain boundary-insulated structure according to claim 4, wherein said inner electrode is made of at least one or more kinds of metals selected from Au, Pt, Rh, Pd or Ni, or alloys or compositions thereof.

12. A method for manufacturing semiconductor-type laminated ceramic capacitors with a grain boundary-insulated structure according to claim 5, wherein said inner electrode is made of at least one or more kinds of metals selected from Au, Pt, Rh, Pd or Ni, or alloys or compositions thereof.

13. A method for manufacturing semiconductor-type laminated ceramic capacitors with a grain boundary-insulated structure according to claim 6, wherein said inner electrode is made of at least one or more kinds of metal selected from Au, Pt, Rh, Pd or Ni, or alloys or compositions thereof.

14. A method for manufacturing semiconductor-type laminated ceramic capacitors with a grain boundary-insulated structure according to claim 7, wherein said inner electrode is made of at least one or more kinds of metals selected from Au, Pt, Rh, Pd or Ni, or alloys or compositions thereof.

15. A method for manufacturing semiconductor-type laminated ceramic capacitors with a grain boundary-insulated structure according to claim 8, wherein said inner electrode is made of at least one or more kinds of metals selected from Au, Pt, Rh, Pd or Ni, or alloys or compositions thereof.

16. A method for manufacturing semiconductor-type laminated ceramic capacitors with a grain boundary-insulated structure according to claim 9, wherein said inner electrode is made of at least one or more kinds of metals selected from Au, Pt, Rh, Pd or Ni, or alloys or compositions thereof.

* * * * *

UNITED STATES PATENT AND TRADEMARK OFFICE
CERTIFICATE OF CORRECTION

PATENT NO. : 5,268,006
DATED : December 7, 1993
INVENTOR(S) : Iwao Ueno et al.

It is certified that error appears in the above-indentified patent and that said Letters Patent is hereby corrected as shown below:

On title page, item [54] and col. 1, lines 2-3, should read as follows:

--METHOD FOR PRODUCING A SEMICONDUCTOR-TYPE LAMINATED CERAMIC CAPACITOR WITH A GRAIN BOUNDARY-INSULATED STRUCTURE--.

Signed and Sealed this

Twentieth Day of December, 1994

Attest:

BRUCE LEHMAN

*Attesting Officer*   *Commissioner of Patents and Trademarks*